(12) United States Patent
Kim et al.

(10) Patent No.: US 8,693,173 B2
(45) Date of Patent: Apr. 8, 2014

(54) DISPLAY APPARATUS

(75) Inventors: Yunjoo Kim, Gyeonggi-do (KR); Jaeho Kim, Gyeonggi-do (KR); Doyoung Kim, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 672 days.

(21) Appl. No.: 12/957,070

(22) Filed: Nov. 30, 2010

(65) Prior Publication Data
US 2011/0242742 A1 Oct. 6, 2011

(30) Foreign Application Priority Data

Apr. 6, 2010 (KR) .................. 10-2010-0031492

(51) Int. Cl.
*H05K 5/00* (2006.01)

(52) U.S. Cl.
USPC ................................... 361/679.01

(58) Field of Classification Search
USPC ................................... 361/679.01
See application file for complete search history.

(56) References Cited

U.S. PATENT DOCUMENTS

| | | | | |
|---|---|---|---|---|
| 4,387,133 A * | 6/1983 | Ichikawa et al. | ............... | 428/215 |
| 2003/0189754 A1 | 10/2003 | Sugino et al. | | |
| 2004/0180148 A1 * | 9/2004 | Hieda et al. | ............... | 428/1.1 |
| 2006/0072005 A1 * | 4/2006 | Thomas-Wayne | ............... | 348/50 |
| 2007/0102737 A1 * | 5/2007 | Kashiwabara et al. | ........ | 257/291 |
| 2008/0218951 A1 * | 9/2008 | Kusuda et al. | ................ | 361/681 |
| 2008/0298001 A1 | 12/2008 | Choi | | |
| 2009/0284693 A1 | 11/2009 | Adachi et al. | | |
| 2010/0053499 A1 | 3/2010 | Sasaki | | |
| 2013/0141654 A1 * | 6/2013 | Lee et al. | ................... | 349/15 |

FOREIGN PATENT DOCUMENTS

| | | |
|---|---|---|
| CN | 101089693 | 12/2007 |
| EP | 1 717 781 | 11/2006 |

OTHER PUBLICATIONS

Partial European Search Report for Application 10015009.3 dated Mar. 22, 2013.
Chinese Office Action for Application No. 201110006567.6 dated Jun. 5, 2013 and English Translation.

\* cited by examiner

*Primary Examiner* — Forrest M Phillips
(74) *Attorney, Agent, or Firm* — KED & Associates LLP

(57) ABSTRACT

A display apparatus is provided. The display apparatus may include a front panel, wherein an entire front surface of the front panel is made of a transparent material. The display apparatus may also include at least one frame attached to a rear surface of the front panel to support the front panel, a display module attached to the frame to output a three-dimensional (3D) image, a layer on a front surface of the front panel, wherein light output from the layer and light output from the display module have a phase difference of 10 nm or less. The display apparatus may further include a rear housing to accommodate the display module and the frame such that a portion of the display module and a portion of the frame are shielded from view from outside of the display apparatus, and wherein the front panel covers whole of the front surface of the display module, and the light transparent material covers whole of the front surface of the front panel and enables the image output by the display module to be viewed from outside of the display apparatus.

19 Claims, 18 Drawing Sheets

DISPLAY APPARATUS

CROSS-REFERENCE TO RELATED APPLICATIONS

This application claims priority under 35 U.S.C. §119 to Korean Application No. 10-2010-0031492 (filed on Apr. 6, 2010), the subject matter of which is incorporated herein by reference.

BACKGROUND

1. Field

Embodiments of the present invention may relate to a display apparatus.

2. Background

With development of an information society, a display apparatus is also being increased in various forms. Various display apparatuses such as a liquid crystal display (LCD), a plasma display panel (PDP), an electro luminescent display (ELD), a vacuum fluorescent display (VFD), etc. have recently been researched and used.

A liquid crystal panel of the LCD may include a liquid crystal layer, and a thin-film-transistor (TFT) substrate and a color filter substrate that face each other with the liquid crystal layer interposed therebetween. The liquid crystal panel may display an image by using light provided from a backlight unit since the liquid crystal panel has no self luminosity power.

BRIEF DESCRIPTION OF THE DRAWINGS

Arrangements and embodiments may be described in detail with reference to the following drawings in which like reference numerals refer to like elements and wherein.

DETAILED DESCRIPTION

Embodiments of the present invention may provide a structure of a display apparatus capable of improving image quality and appearance.

An exemplary embodiment may provide a display apparatus that includes a display panel, a front panel disposed on a front surface of the display panel, and a front film (or layer) disposed on a front surface of the front panel, wherein a phase difference generated by the front film is 10 nm or less. The front film may be a triacetyl cellulose (TAC) film.

Embodiments of the present invention may be described with reference to the accompanying drawings. Exemplary embodiments may be modified in various different ways, all without departing from the spirit or scope of the exemplary embodiments. The exemplary embodiments are provided so that those skilled in the art may more completely understand embodiments of the present invention. Accordingly, shape, size, etc., of elements in the figures may be exaggerated for explicit comprehension.

Figure 1:
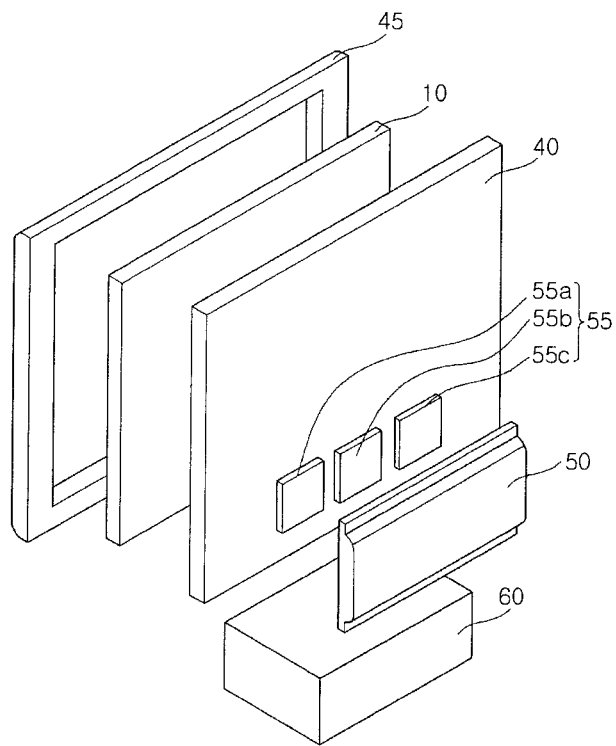
FIGS. 1 and 2 are views illustrating a display apparatus.

FIG. 1 is a view illustrating a display apparatus.

As shown in FIG. 1, the display apparatus may include a display module 10, a front cover 45 and a back cover 40 that covers the display module 10, a driver 55 with the back cover 40, and a driver cover 50 that covers the driver 55.

The front cover 45 may include a front panel made of a transparent material that transmits light. The front panel may be spaced apart from the display module 10 to protect the display module 10 and transmit light emitted from the display module 10 to allow an image displayed in the display module 10 to be viewed from the outside.

The front cover 45 may be formed by a flat panel without a window. The front cover 45 may be made of the transparent material that transmits light (i.e., injection molded plastic). When the front cover 45 is formed by the flat panel, a frame may be removed from the front cover 45. The back cover 40 may be coupled with the front cover 45 to protect the display module 10.

The driver 55 may be provided on one surface of the back cover 40. The driver 55 may include a driving controller 55a, a main board 55b, and a power supply 55c. For example, the driving controller 55a may be a timing controller. The driving controller 55a may be the driver that controls an operation timing of each driver IC of the display module 10. The main board 55b may be the driver that transfers V sync., H sync., and R, G, and B resolution signals to the timing controller. The power supply 55c may be the driver that applies power to the display module 10.

The driver 55 may be provided in the back cover 40 and may be covered by the driver cover 50. A plurality of holes may be provided in the back cover 40 to be connected to the display module 10 and the driver 55. A stand 60 for supporting the display apparatus may also be provided.

Figure 2:
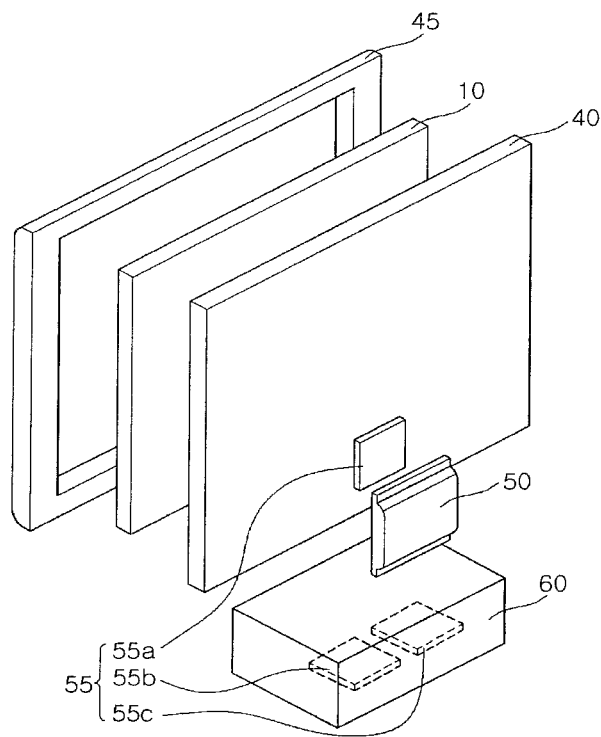

As shown in FIG. 2, the driving controller 55a of the driver 55 may be provided in the back cover 40 and the main board 55b, and the power supply board 55c may be provided on the stand 60. Additionally, the driver cover 50 may cover only the driver 55 provided in the back cover 40.

The main board 55b and the power supply board 55c may be separately configured, but may be configured as one integrated board, although embodiments and configurations are not limited thereto.

The display apparatus according to an exemplary embodiment may display a 3 dimensional (3D) image. The term 3-D or 3D may be used to describe a visual expression or a display technique to reproduce a 3D moving picture having an illusion effect of depth (i.e., a perceived depth). A visual cortex of an observer may analyze two images as one 3D image with respect to a left-eye image and a right-eye image.

The 3 dimensional (3D) display technique may adopt a technique of processing and expressing the 3D image with respect to an apparatus capable of displaying the 3D image.

As the apparatus capable of displaying the 3D image, a special observation apparatus may be used to effectively provide the 3D image to the observer.

Examples of processing and expressing the 3D image may include stereoscopic image/video capture, multi-view image/ video capture using a plurality of cameras, processing of a 2D image and depth information, and/or the like. An example of the display apparatus capable of displaying the 3D image may include a liquid crystal display (LCD), a digital TV screen, a computer monitor, and/or the like that have appropriate hardware and/or software supporting the 3D display technique. An example of the special observation apparatus may include a specialized spectacle, a goggle, a head gear, an eyewear, and/or the like.

The 3D image display technique may be an anaglyph stereoscopic image (generally used together with passive stereo glasses), a polarized stereoscopic image (generally used together with passive polarized glasses), alternate-frame sequencing (generally used together with active shutter glasses/head gear), an autostereoscopic display using a lenticular or barrier screen, and/or the like. Diversified spirits and features to be described below may be applied to the stereoscopic image display technique.

Figure 3:
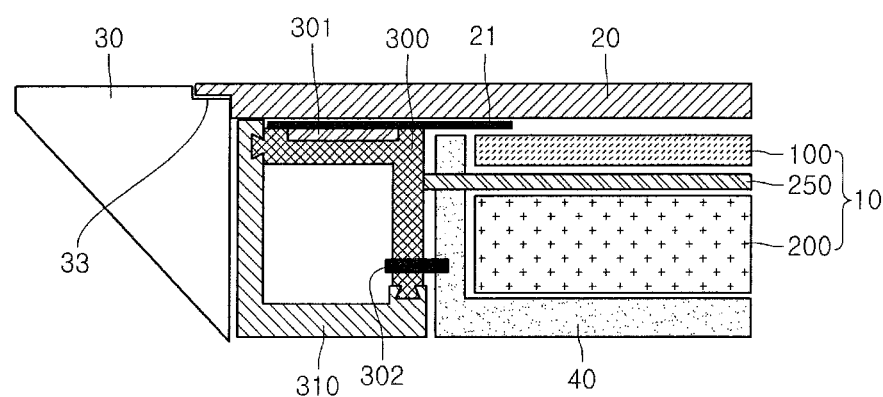
FIGS. 3 and 4 are cross-sectional views illustrating a display apparatus.

FIG. 3 is a cross-sectional view illustrating a display apparatus according to an exemplary embodiment of the present invention. The same components as described with reference to FIGS. 1 and 2 may not be described below for ease of description A support member for fixing (or attaching) the front panel 20 on a front surface of the display module 10 may be formed on a lateral surface of the display module 10.

As shown in FIG. 3, the display module 10 may include a display panel 100, a backlight unit 200, and an optical sheet 250 between the display panel 100 and the backlight unit 200. A back cover 40 may be positioned in the rear of the display module 10.

A first support member 300 for attaching (or fixing) the front panel 20 to the display module 10 may be positioned on a lateral surface of the display module 10.

The first support member 300 may be attached to the front panel 20 where a light shielding layer 21 (or light shielding pattern) may be formed by using an adhesion member 301 and the first support member may be connected with the display module 10 by using a fixation member 302.

The front panel 20 may be supported and attached to the front surface of the display module 10 by the first support member 300, the adhesion member 301, and the fixation member 302 and a gap between the display module 10 and the front panel 20 may be reduced to reduce overall thickness of the display apparatus.

As one example, the first support member 300 may be a bar extruded in an 'L' shape by using metal such as aluminum (Al), and/or the like and as a result, may improve fixation (or attachment) between the display module 10 and the front panel 20 and rigidity of the display apparatus. The fixation member 302 for attaching (or fixing) the display module 10 to the first support member 300 may be a screw that penetrates the first support member 300.

A rear surface of the front panel 20 may be etched or film-laminated in order to prevent a stain.

A second support member 310 positioned in the display apparatus may be connected with the first support member 300 and may form a rear surface of the display apparatus together with the back cover 40.

The second support member 310 may be connected with the first support member 300 to further improve rigidity of the display apparatus and prevent the first support member 300 and the fixation member 302 from being exposed on the rear surface. The second support member 310 may be an 'L'-shaped extrusion bar made of metal such as the aluminum (Al), and/or the like similarly to the first support member 300.

A transparent bezel 30 may be formed on an outer peripheral region of the display apparatus to surround the first support member 300, and may be coupled and attached (or fixed) to the front panel 20 by using an installation groove 33.

Figure 4:
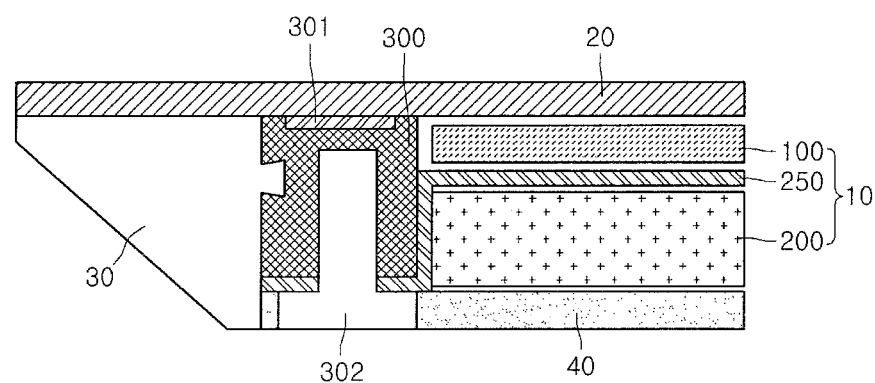

FIG. 4 is a cross-sectional view illustrating a display apparatus according to an exemplary embodiment of the present invention. The same components as described with reference to FIGS. 1 to 3 may not be described below for ease of illustration.

As shown in FIG. 4, a support member 300 for attaching (or fixing) the front panel 20 to the display module 10 may be positioned on a lateral surface of the display module 10. The first support member 300 may be attached to the front panel 20 by the adhesion member 301.

As one example, the support member 300 may be a bar extruded in an 'L' shape by using metal such as aluminum (Al), and/or the like and as a result, may improve the attachment (or fixation) between the display module 10 and the front panel 20 and rigidity of the display apparatus.

The fixation member 302 for connecting the display module 10 and the front panel 20 to each other by attaching the display module 10 to the support member 300 may be formed through the back cover 40.

For example, as shown in FIG. 4, the fixation member 302 may be a screw that penetrates the back cover 40 and thereafter is coupled to the first support member 300.

The front panel 20 may be formed on the front surface of the display apparatus and the bezel 30 may be coupled on a rear surface of the front panel 20.

Figure 5:
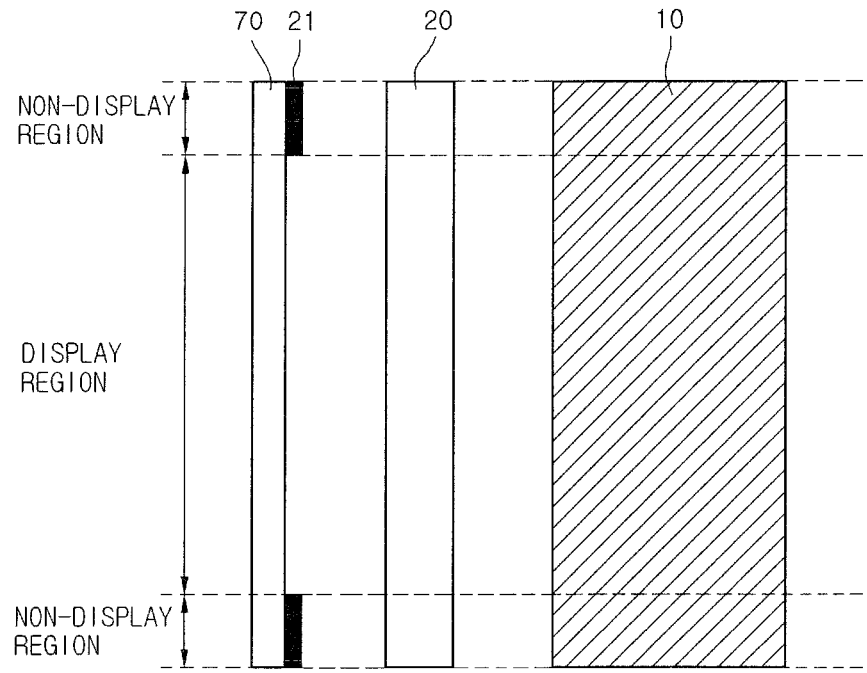
FIG. 5 is a cross-sectional view illustrating a display apparatus according to an example embodiment of the present invention.

FIG. 5 is a cross-sectional view illustrating a display apparatus according to an exemplary embodiment of the present invention. The same components as described with reference to FIGS. 1 to 4 may not be described for ease of description.

As shown in FIG. 5, the display module 10 may display an image by emitting light toward a front surface where the front panel 20 is provided. For example, the display module 10 may be a liquid crystal display module and the display module 10 may include a liquid crystal panel and a backlight unit (not shown). The liquid crystal panel (not shown) may display an image by using light provided from the backlight unit (not shown) and for this, the liquid crystal panel (not shown) may include a liquid crystal layer, and a TFT substrate and a color filter substrate that face each other with the liquid crystal layer provided therebetween.

The front panel 20 may be spaced apart from the display module 10 by a predetermined gap and may be provided on the front surface of the display module 10 to protect the display module 10 from an external impact and to transmit light emitted from the display module 10 to allow the image displayed in the display module 10 to be viewed from the outside.

For example, the front panel 20 may be made of a plastic material such as polycarbonate (PC), and/or the like or a glass material having impact-resistance and light transmittance.

A front layer 70 (or a front film) may be provided on a front of the front panel 20. A light shielding layer 21 for shielding light may be formed on a peripheral part on a rear surface of the front layer 70.

As shown in FIG. 5, the front layer 70 may include a display region where the image is displayed by transmitting the light emitted from the display module 10 and a non-display region that surrounds the display region. The light shielding layer 21 shielding light may be formed in the non-display region.

When the display apparatus is turned off, a part of the display region where the image is not displayed may show a black color similar to the non-display region. However, in this example, external light incident from the outside may be reflected, absorbed, and/or scattered differently in the display region and the non-display region.

For example, in the display region, external light may be partially reflected by a display panel provided therein and in the non-display region where a black layer is printed, most of light may be absorbed. As a result, when power is off, a visual heterogeneity may be generated between the display region and the non-display region of the display apparatus. The visual heterogeneity may clearly be expressed on a boundary between the display region and the non-display region and may deteriorate design characteristics of the display apparatus.

A metal thin film layer (not shown) may overlap with the light shielding layer 21 on one surface of the front layer 70. That is, the light shielding layer 21 and the metal thin film layer (not shown) may overlap with each other in the non-display region of the front layer 70.

The metal thin film layer (not shown) may be formed by depositing metal (i.e., nickel (Ni) or aluminum (Al)) on one surface of the front panel 20.

The metal thin film layer (not shown) may have reflectance and transmittance for light by characteristics of metal and characteristics of a thin film. As a result, the metal thin film layer may partially reflect the external light incident from the outside and partially transmit the light.

The light shielding layer 21 may be a black layer printed by a black color. For example, the light shielding layer 21 may be configured by forming the black print layer on the metal thin film layer (not shown) formed on a first surface of the front layer 70.

As the metal thin film layer (not shown) has both light reflectance and transmittance, a part of the external light incident into the non-display region may be reflected on the metal thin film layer (not shown) to be emitted toward the front surface (i.e., a user again) and the rest part of external light incident into the non-display region may be transmitted through the metal thin film layer (not shown) and absorbed in the light shielding layer 21.

The reflection of the external light generated in the display region of the display apparatus may be generated on the non-display region, and more specifically, even the metal thin film layer (not shown) formed in the non-display region.

A part of the external light incident into the non-display region may be transmitted through the metal thin film layer (not shown) to be absorbed in the light shielding layer 21 (i.e., the printed black layer). Therefore, the external light generated in the display region may be absorbed in the non-display region and both the display region and the non-display region may show the black color.

As a result, when the display apparatus is viewed from the front surface, a similar visual reflection effect may be acquired in the display region and the non-display region, thereby reducing visual heterogeneity between the display region and the non-display region.

Figure 6:
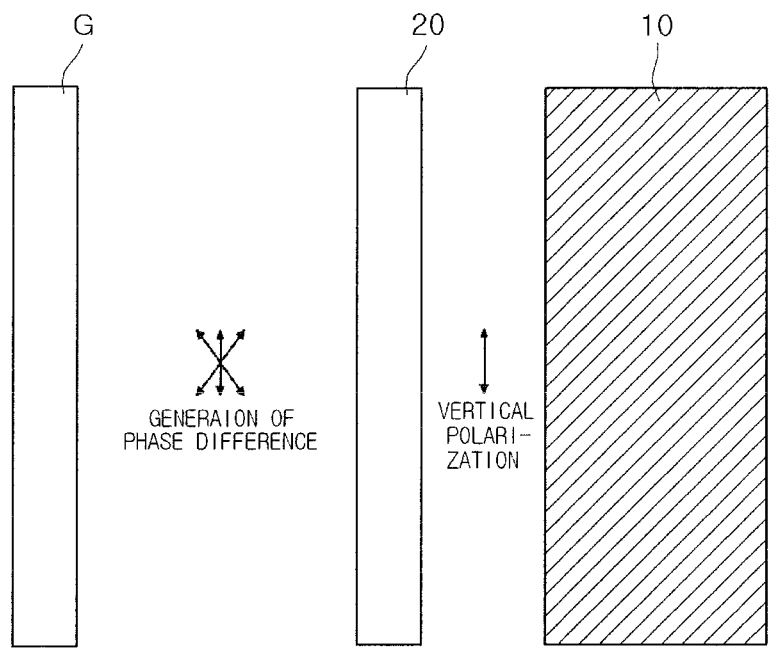
FIGS. 6 and 7 are cross-sectional views for describing deterioration of an image quality of a 3D display image depending on generation of a phase difference.
Figure 7:
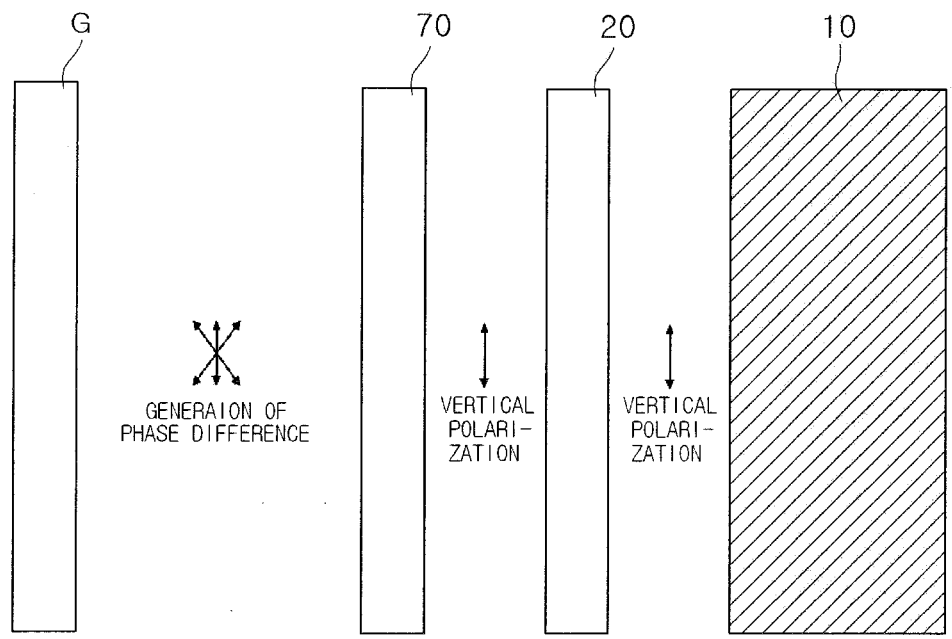

FIGS. 6 and 7 are diagrams for describing deterioration of an image quality of a 3D display image depending on generation of a phase difference.

In the case of the liquid crystal display (LCD), an upper polarizer and a lower polarizer are attached on a front surface and a rear surface of a display panel (i.e., a liquid crystal panel and the lower polarizer are attached to a bottom of the liquid crystal panel to polarize light that passes via a backlight unit and the upper polarizer is attached to the front surface of the liquid crystal panel to polarize light that passes via the liquid crystal panel). As a result, a liquid crystal display module 10 may emit vertically polarized light.

As shown in FIG. 6, in an example in which the display module 10 emits the vertically polarized light to display an image, a phase difference may be generated by the front panel 20 provided on the front surface of the display module 10.

In the example in which the display apparatus displays the 3D image, the 3D image displayed by the display module 10 may be observed by using vertically polarized transmissive 3D glasses G.

For example, the vertically polarized transmissive 3D glasses G may include a layer having a vertical polarization axis and a layer having a horizontally polarization axis on front and rear surfaces, respectively, such that the user may view the 3D image displayed in the display module 10 with a 3D effect by using the 3D glasses G.

In the example where a phase difference is generated in the vertically polarized 3D image displayed in the display module 10 by the front panel 20, a stripe in a predetermined direction (i.e., a vertical direction) is generated in the image observed by the vertically polarized transmissive glasses G, thereby deteriorating image quality of the 3D image.

The front panel 20 may be a reinforced glass. The reinforced glass may be formed by heat-treating or chemically processing a general glass in order to improve rigidity, impact-resistance, heat-resistance, and/or the like.

More specifically, general glass may be heated at a softening point or higher and transformed to a desired shape and thereafter rapidly quenched with compressed air to form the reinforced glass, and/or the general glass may be heated at a softening point or lower and may be blown with cool air to form a semi-reinforced glass.

The phase difference may be generated on the glass surface of the reinforced or semi-reinforced glass manufactured as described above by high-temperature heating, and/or the like. For example, a phase difference of approximately 20 nm or more may be generated in the reinforced or semi-reinforced glass.

As a result, in the example in which the front panel 20 is configured by the reinforced or semi-reinforced glass, the phase difference of approximately 20 nm or more may be generated, such that the vertical-direction stripe may be generated when the 3D image is observed using the vertically polarized transmissive 3D glasses G.

In the example of a non-reinforced glass that is not subjected to the reinforcement processing, a very small phase difference (i.e., a phase difference of approximately 0.5 nm or less) may be generated as compared with the reinforced or semi-reinforced glass.

According to an exemplary embodiment, the front panel 20 may be configured by non-reinforced glass, and as a result, since only a small phase difference of approximately 0.5 nm or less is generated by the front panel 20, the stripe may not be generated in the 3D image when the 3D image is observed by using the vertically polarized transmissive 3D glasses G. Therefore, image quality of the 3D image may be improved.

As shown in FIG. 7, in the example in which the front layer 70 is provided on the front surface of the front panel 20, a phase difference may be generated by even the front layer 70, such that the image quality of the 3D image may deteriorate.

For example, in the case in which the front layer 70 is made of PET, birefringence may be generated by crystallity of the material itself or an anisotropic property may be generated by an extension process at a time of manufacturing a film such that a change in phase difference of approximately 1000 nm or more may be measured.

As a result, polarization may be generated by the phase difference generated by the front layer 70 made of PET such that a rainbow phenomenon may be recognized in the vertically polarized transmissive 3D glasses G. As a result, image quality of the 3D image viewed by the user may deteriorate.

According to an exemplary embodiment, in an example in which the phase difference generated by the front layer 70 decreases to 10 nm or more, image quality of the 3D image may be prevented from being deteriorated.

In order to prevent or reduce the polarization phenomenon of the 3D image, the front layer 70 may include an isotropic material having a small phase difference (i.e., a triacetyl cellulose (TAC) film).

The birefringence may not be generated by the isotropic property of the TAC film. For example, a change in phase difference of approximately 10 nm or less may be measured by a manufacturing process of film-forming, for example, a triacetyl cellulose (TAC) piece by using solution casting.

According to the exemplary embodiment, the front layer 70 may include the TAC film, and as a result an image quality of the 3D image may be prevented from being deteriorated by reducing the phase difference generated by the front layer 70.

The front layer 70 may be on a front surface of the front panel 20 such that light output from the front layer 70 and light output from the display module 10 have a phase difference of 10 nm or less. That is, the light output from the display module 10 and light output from the front layer 70 have a phase difference of 10 nm or less.

Figure 8:
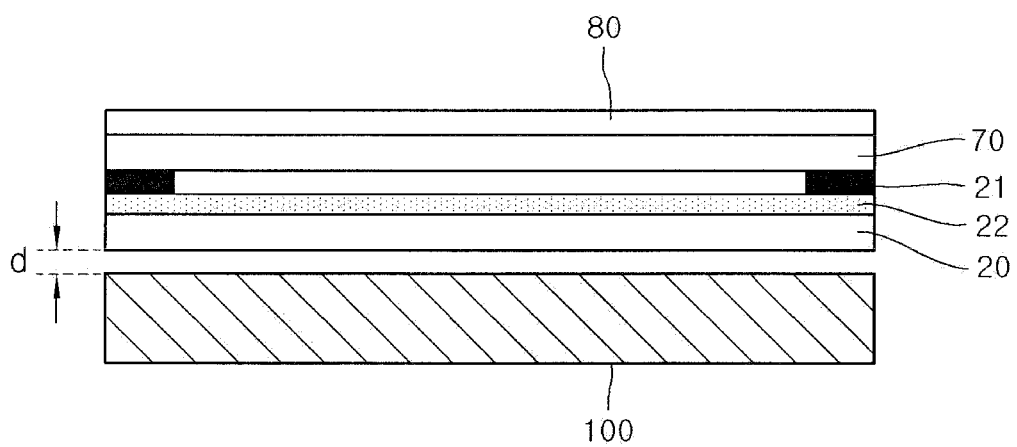
FIG. 8 is a cross-sectional view illustrating a display apparatus according to an exemplary embodiment of the present invention.

FIG. 8 is a cross-sectional view illustrating a display apparatus according to an exemplary embodiment of the present invention. The same components as described with reference to FIGS. 1 to 7 may not be described below for ease of discussion.

As shown in FIG. 8, the front panel 20 formed by the non-reinforced glass may be provided on the front surface of a display panel 100 with a predetermined distance d. The display panel 100 may correspond to the display module 10 discussed above.

A part of light emitted from the display panel 100 may be reflected on the front panel 20 to go toward the display panel 100 and may again be reflected on the display panel 100 to transmit to the front panel 20 and thereafter be emitted to the user.

As such, by light reflected in a space between the display panel 100 and the front panel 20, a screen overlay phenomenon may be generated in which a display image is viewed to the user as a double image.

For example, as the distance d between the display panel 100 and the front panel 20 increases, a double image distance may increase. As a result, it may be viewed to the user as if a screen is overlaid. On the contrary, if the distance d between the display panel 100 and the front panel 20 decreases, the double image distance may decrease.

The screen overlay phenomenon may not be visually perceived to the user having a viewing angle θ of 45° or less, such that the distance d between the display panel 100 and the front panel 20 may be 8.4 mm or less in order to enhance deterioration of image quality depending on a screen overlay phenomenon.

Meanwhile, the display panel 100 and the front panel 20 may be connected and fixed (attached) on a lateral surface by using support members as described above with respect to FIGS. 3 and 4.

The front layer 70 (i.e., the TAC layer) may be provided on the front surface of the front panel 20, the light shielding layer 21 may be formed on the rear surface of the front layer 70, and an adhesion layer 22 may be formed between the front layer 70 and the front panel 20.

The front layer 70 (TAC film) with the light shielding layer 21 may be attached to the front surface of the front panel 20 by using the adhesion layer 22 (i.e., a pressure sensitive adhesive (PSA) coating layer).

By configuring the front panel 20 by the non-reinforced glass and attaching the front layer 70 (TAC film) with the light shielding layer 21 to the front surface of the front panel 20 by using the adhesion layer 22, deterioration of the image quality (such as the rainbow phenomenon depending on phase difference) may be improved at a time of displaying a 3D image.

A hard coating layer 80 for reinforcing rigidity of the front layer 70 (TAC layer) may be provided on a front surface of the front layer 70 (TAC layer). For example, the hard coating layer 80 may be formed by coating on the front surface of the front layer 70 (TAC layer) with an anti-reflection (AR) layer.

Figure 9:
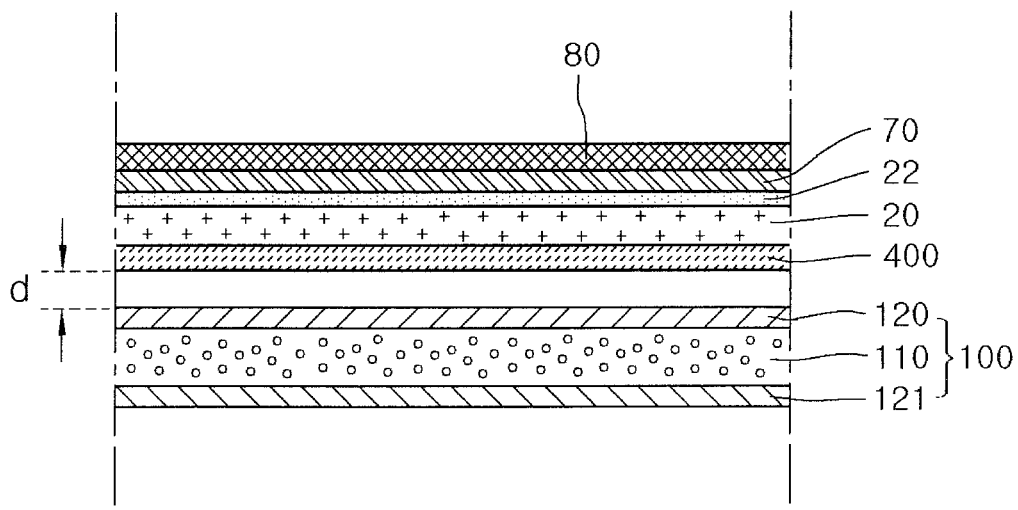
FIG. 9 is a cross-sectional view illustrating a display apparatus according to an exemplary embodiment of the present invention.

FIG. 9 is a cross-sectional view illustrating a display apparatus according to an exemplary embodiment of the present invention and illustrates a cross-sectional structure of a part of the display apparatus. The same components as components described with reference to FIGS. 1 to 8 may not be described below for ease of description. FIG. 9 shows the front layer 70 on a front surface of the display apparatus. Light output from the front layer 70 and light output from the display panel 100 or display module 10.

As shown in FIG. 9, upper and lower polarizers 120 and 121 may be attached to the front and rear surfaces of a liquid crystal panel 110, respectively and an anti-reflection (AR)/anti-glare (AG) film (not shown) may be formed on a front surface of the upper polarizer 120 as a protection layer.

The lower polarizer 121 may be attached to a bottom of the liquid crystal panel 110 to polarize light that passes via a backlight unit and the upper polarizer 120 may be attached to the front surface of the liquid crystal panel 110 to polarize light that passes via the liquid crystal panel 110.

Each of the polarizers 120 and 121 may include a polarization film that polarizes incident light and a film may be attached to at least one surface of the polarization film. For example, in the case of the polarizers 120 and 121, the TAC film (or TAC layer) may be attached to the top and bottom surfaces of a poly vinylalcohol (PVA) film, which is the polarization film.

As the distance d between the display panel 100 and the front panel 20 decreases, interference of light reflected on each of the display panel 100 and the front panel 20 may be generated. The interference phenomenon may be divided into cancellation interference and reinforcement interference. In the example of the cancellation interference, phases of the lights are cancelled with each other to be displayed dark and in the example of the reinforcement interference, phases of the lights may be combined with each other to be displayed bright. A Newton's ring phenomenon of a ring pattern may be generated by interference of the reflected light and the Newton's ring phenomenon makes luminance of the display image nonuniform to deteriorate the image quality.

According to an exemplary embodiment, an anti-reflection layer 400 may be provided between the display panel 100 and the front panel 20.

The anti-reflection layer 400 may be formed on the rear surface of the front panel 20 and the anti-reflection layer 400 may prevent external light incident from the outside from being reflected on the display panel 100 and thereafter re-reflected on the front panel 20 and/or remarkably reduce the external light.

The interference phenomenon from among the lights that are re-reflected on the front panel 20 may be reduced, and as a result the Newton's ring phenomenon may be reduced as described with reference to FIG. 6.

For example, the anti-reflection layer 400 may be an anti glare (AG) or an anti-reflection (AR) layer.

The AG layer formed by the anti-reflection layer 400 that is formed on the rear surface of the front panel 20 may include a plurality of scattering particles and may prevent the external light reflected from the display panel 100 from being scattered by the scattering particles to be re-reflected on the display panel 100.

The AG layer may be configured by mixing transparent scattering particles (i.e., a transparent bead or filer with a hard coating solution) and applying it to the rear surface of the front panel 20 to form the anti-reflection layer 400.

For example, the AG layer may be formed on the rear surface of the front panel 20 so that at least two kinds of transparent fine particles are included in an acrylate binder resin. The refractive index of the transparent fine particles may be in a range of 0.03 to 0.2 with respect to a binder and the transparent fine particles may have different refractive indexes.

Meanwhile, in the example in which the anti-reflection layer 400 is configured by the AG layer, a specular reflectivity of the AG layer is preferably 2.5% or less in order to reduce Newton's ring phenomenon.

Further, the AR layer formed by the anti-reflection layer 400 that is formed on the rear surface of the front panel 20 may include a plurality of layers having different refractive indexes and may prevent the external light reflected from the display panel 100 from being re-reflected on the display panel 100 by the cancellation interference on an interface between the layers.

For example, the AR layer may be configured by laminating layers having a low refractive index on a one surface of a synthetic resin made film having high transparency such as polyethylene terephthalate or polycarbonate with an inorganic material such as silica or fluorinated magnesium or alternately laminating the layers having high refractive index and the layers having low refractive index on one surface of the synthetic resin made film with an inorganic material such as titanium oxide or tin oxide.

Meanwhile, in the example in which the anti-reflection layer 400 is configured by the AR layer, specular reflectivity of the AR layer is preferably 1% or less in order to reduce Newton's ring phenomenon.

Further, transmittance of the anti-reflection layer 400 configured as discussed above is in a range of 88 to 93 and haze is preferably in a range of 0.18 to 0.26 in order to reduce Newton's ring phenomenon within a range that does not remarkably interrupt luminance of the display image depending on light emitted from the display panel 100.

According to an exemplary embodiment, the anti-reflection layer 400 may be configured by forming a micro-pattern on one surface of a base film.

The base film of the anti-reflection layer 400 may be made of a transparent plastic material such as polyethylene terephthalate (PET), polycarbonate (PC), polyvinyl chloride (PVC), and/or polypropylene (PP).

The micro-pattern may mean a small pattern of which a width w, a height h, and a gap p between the patterns is formed by the unit of a micrometer (μm) and may be made of a transparent material having light transmittance.

The micro-pattern may protrude toward the display panel from the base film to prevent or reduce external light reflected on the display panel 100 from being re-reflected on the front panel 20.

For example, the micro-pattern of the anti-reflection layer 400 may be formed by applying a coating solution including a plurality of scattering particles onto one surface of the base film. The scattering particles included in the coating solution may form the micro-pattern shown in FIG. 8 to avoid interference distance of light.

Alternatively, the anti-reflection layer 400 may be formed by printing the micro-pattern on one surface of the base film.

Meanwhile, in the example in which a width w of the micro-pattern increases, an anti-reflection function may deteriorate while luminance of the image is deteriorated and in the example in which the gap p between two adjacent micro-patterns increases, a probability that the Newton's ring phenomenon depending on interference of the light will be generated may increase.

Further, in the example in which height h of the micro-pattern increases, a gap between the micro-pattern and the display panel 100 decreases, such that the micro-pattern may be damaged due to contact with the front surface of the display panel 100 by external impact, and/or the like.

Therefore, the anti-reflection layer 400 may reduce the Newton's ring phenomenon within a range to not remarkably deteriorate luminance of the image. It is preferable that height h of the micro-pattern is 12 μm or less, width w of the micro-pattern is 21 μm or less, and a gap p between the micro-patterns is 350 μm or less in order to ensure structural stability of the display apparatus.

In the example in which the display apparatus displays the 3D image, a phase difference is generated by the base film included in the anti-reflection layer 400. Therefore, the image quality of the 3D image may deteriorate.

In order to prevent or reduce a polarization phenomenon of the 3D image, the base film of the anti-reflection layer 400 may adopt an isotropic material having a small phase difference (i.e., a triacetyl cellulose (TAC) film).

Accordingly, the micro-pattern may be formed on the TAC film by configuring the base film of the anti-reflection layer 400 by the TAC film to have the anti-reflection function and in addition improve deterioration of the image quality such as the rainbow phenomenon depending on polarization at a time of displaying the 3D image.

For example, the anti-reflection layer 400 may be formed by applying a coating solution including silica onto one surface of the TAC film, which is the base film.

More specifically, by applying and curing a coating solution acquired by mixing binder, organic silicate, and colloidal silica in a solvent onto the TAC film with a predetermined thickness, the anti-reflection layer 400 may have improved anti-reflection performance and high transparency.

When the organic silicate having four alkyl groups is cured, '—SiO— binding like glass may be generated through an intermediate to have an inorganic property. The organic silicate may be reacted as not a complete polymer form but a precursor through prereaction to form the colloidal silica.

The compound is not completely crosslinked like glass and the reaction is stopped in a middle progress state by external conditions. In the example in which the organic silicate is directly reacted, a reaction time increases and the condition is complicated. Therefore, colloidal silica is used. Since this compound exists in a particle form having a predetermined size in addition to the above advantage, it may have a property to prevent glittering by scattering light when it is used for surface coating.

The binder may prevent the film applied onto the TAC film from being deformed due to a solvent or external friction and may have a characteristic to allow the micro-pattern to be completely attached to the film.

As the binder, both an organic binder and an inorganic binder may be used, but in particular, when a coating thickness of the binder onto the TAC film is adjusted and the inorganic binder having an appropriate refractive index is used, a low reflection effect may further be improved.

FIGS. 10 to 28 are diagrams illustrating exemplary embodiments of a backlight unit provided in a display apparatus. Other embodiments and configurations may also be provided.

The display module 10 may include the display panel 100 and a backlight unit 200. The display module 100 may include the backlight unit 200 that extends on the display panel 100 and the backlight unit 200 may be positioned in the lower part of the display panel to correspond to a region of the display panel 100 that displays an image. For example, the size of the backlight unit 200 may be the same as or similar as that of the display panel 100.

The display apparatus may be configured by closely attaching the backlight unit 200 to the rear surface of the display panel 100.

For example, the backlight unit 200 may be bonded and fixed (or attached) to the bottom of the display panel 100, and more specifically to the lower polarizer. An adhesion layer (not shown) can be provided between the lower polarizer and the backlight unit 200.

An entire thickness of the display apparatus may be reduced by closely contacting the backlight unit 200 to the rear surface of the display panel 100, thereby improving an appearance of the display apparatus and simplifying a structure and manufacturing process of the display apparatus by removing a structure for fixing or attaching the backlight unit 200.

By removing a space between the backlight unit 200 and the display panel 100, a malfunction of the display apparatus or deterioration in the image quality of the display image that is caused due to insertion of foreign substances may be prevented.

The backlight unit 200 may be configured by laminating a plurality of functional layers and at least one layer of the plurality of functional layers may be provided with a plurality of light sources (not shown).

As described above, the backlight unit 200, and more specifically the plurality of layers configuring the backlight unit 200, may be made of flexible materials, respectively, so as to closely attach (or fix) the backlight unit 200 to the bottom of the display panel 100.

The display panel 100 may be divided into a plurality of regions. The brightness of light emitted from the corresponding region of the backlight unit 200 (i.e., the brightness of the corresponding light source) may be adjusted in accordance with a gray peak value or a color coordinate signal of each of the divided regions, such that luminance of the display panel 100 may be adjusted.

The backlight unit 200 may operate while being divided into a plurality of division driving regions corresponding to the divided regions of the display panel 100, respectively.

Figure 10:
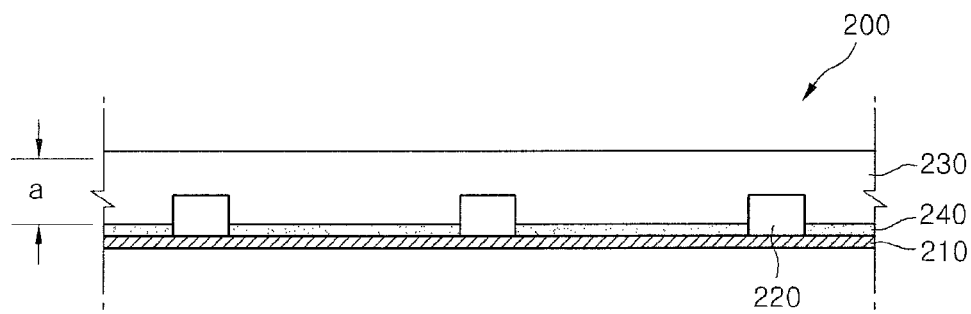
FIGS. 10 to 28 are diagrams illustrating exemplary embodiments of a backlight unit provided in a display apparatus.

As shown in FIG. 10, the backlight unit 200 may include a first layer 210, a light source 220, a second layer 230, and a reflection layer 240.

As shown in FIG. 10, a plurality of light sources 220 may be formed on the first layer 210 and the second layer 230 may be provided on the top of the first layer 210 to cover the plurality of light sources 220. The second layer 230 may full cover the plurality of light sources 220 formed on the first layer 210. As another example, the second layer 230 may cover only predetermined portions or predetermined surfaces of the plurality of light sources 220 formed on the first layer 210.

The first layer 210 may be a substrate on which the plurality of light sources 220 are mounted. An electrode pattern (not shown) for connecting the light source 220 with an adapter (not shown) for supplying power may be formed on the first layer 210. For example, a carbon nanotube electrode pattern (not shown) for connecting the adapter (not shown) with the light source 220 may be formed on the top of the substrate.

The first layer 210 may be formed by using polyethylene-terephthalate, glass, polycarbonate, silicon, and/or the like, and may be a printed circuit board (PCB) on which the plurality of light sources 220 are mounted and may have a film shape.

The light source 220 may be a light emitting diode (LED) chip or one of light emitting diode packages with at least one light emitting diode chip. One example in which the light emitting diode package is provided as the light source 220 may be described.

The LED packages configuring the light source 220 may be classified as a top view scheme and a side view scheme in accordance with a direction in which a light emitting surface faces. The light source 220 may be configured by using at least one of the top view-scheme LED package in which the light emitting surface is the top of the LED package (e.g., light is emitted in the top direction or in a vertical direction) and the side view-scheme LED package in which the light emitting surface is the top of the LED package (e.g., light is emitted in the side direction or in a horizontal direction).

The light source 220 may include a colored LED or a white LED emitting at least one color among colors such as red, blue, and green colors, etc. The colored LED may include at least one of a red LED, a blue LED, and a green LED. Disposition and emitting light of the light emitting diode may be modified.

The second layer 230 may be provided on the top of the first layer 210 to cover the plurality of light sources 220 and may uniformly provide the light emitted from the light source 220 to the display panel 100 by transmitting and diffusing the light emitted from the light source 220.

The reflection layer 240 that reflects the light emitted from the light source 220 may be formed between the first layer 210 and the second layer 230 (i.e., on the top of the first layer 210). The reflection layer 240 on the top of the first layer 210 may more widely diffuse the light emitted from the light source 220 by reflecting light full-reflected from a boundary of the second layer 230 again.

As the reflection layer 240, a sheet to which a white pigment such as titanium oxide is dispersed among sheets made of a synthetic resin, a sheet laminated with a metal deposition film onto the surface thereof, a sheet in which a bubble is dispersed so as to scatter the light among the sheets made of the synthetic resin, and/or the like may be used. The surface of the reflection layer 240 may be coated with silver (Ag) so as to increase reflectance. The reflection layer 240 may be coated on the top of the first layer 210, which is the substrate.

The second layer 230 may be configured by a light transmissive material (i.e., silicon or an acrylic resin). However, the second layer 230 is not limited to the above-mentioned material and may be made of various resins in addition to the above-mentioned material.

The second layer 230 may be made of a resin having a refractive index in a range of approximately 1.4 to 1.6 so that the backlight unit 200 has uniform luminance by diffusing the light emitted from the light source 220.

For example, the second layer 230 may be made of any one material selected from a group consisting of polyethyleneterephthalate, polycarbonate, polypropylene, polyethylene, polystyrene and polyepoxy, silicon, acryl, and/or the like.

The second layer 230 may include a polymer resin having predetermined adhesiveness so as to be tightly and closely attached to the light source 220 and the reflection layer 240. For example, the second layer 230 may include unsaturated polyester, an acryl-based material such as ethyl methacrylate, isobutyl methacrylate, normal butyl methacrylate, normal butyl methyl methacrylate, acrylic acid, methacrylic acid, hydroxy ethyl methacrylate, droxy propyl methacrylate, hydroxyl ethyl acrylate, acryl amide, methylol acryl amide, glycidyl methacrylate, ethyl acrylate, isobutyl acrylate, normal butyl acrylate, 2-ethyl hexyl acrylate polymer or copolymer or terpolymer, an urethane-based material, an epoxy-based material, and a melamine-based material.

The second layer 230 may be formed by applying and curing a liquid or gel-type resin to the top of the first layer 210 where the plurality of light sources 220 and the reflection layer 240 are formed or the second layer 230 may separately be fabricated and bonded to the top of the first layer 210.

As the thickness a of the second layer 230 increases, the light emitted from the light source 200 may be more widely diffused, such that the light having uniform luminance may be provided to the display panel 100 from the backlight unit 200. As the thickness a of the second layer 230 increases, quantity of light that is absorbed in the second layer 230 may increase. As a result, luminance of the light provided to the display panel 100 from the backlight unit 200 may uniformly decrease.

Accordingly, in order to provide the light having uniform luminance while not largely decreasing luminance of the light provided to the display panel 100 from the backlight unit 200, the thickness a of the second layer 230 may be in a range of 0.1 to 4.5 mm.

The configuration of the backlight unit 200 may be described in detail by using an example in which the first layer 210 provided in the backlight unit 100 is a substrate where the plurality of light sources 200 are formed and the second layer 230 is a resin layer made of a predetermined resin as one example.

Figure 11:
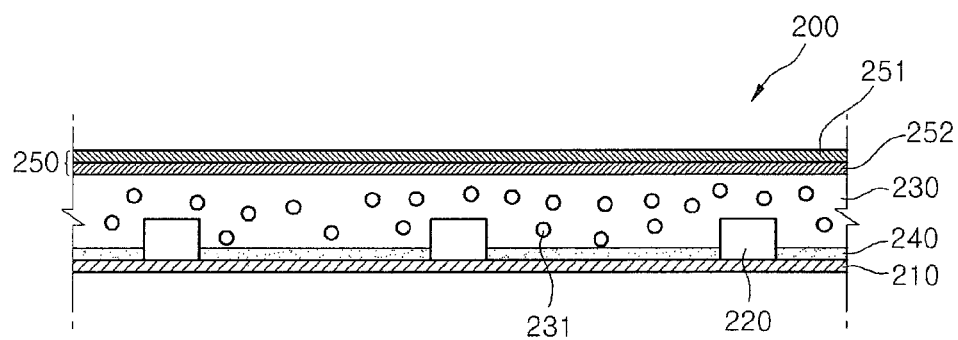

As shown in FIG. 11, the plurality of light sources 220 may be mounted on the substrate 210 and the resin layer 230 surrounding all or some of the light sources 220 may be provided on the top of the substrate 210. The reflection layer 240 may be formed between the substrate 210 and the resin layer 230 (i.e., on the top of the substrate 210).

Further, the resin layer 230 may include a plurality of scattering particles 231 and the scattering particles 231 may more widely diffuse the light emitted from the light source 220 by scattering or refracting incident light.

The scattering particles 231 may be made of a material having a refractive index different from the material configuring the resin layer 230, and more specifically a material having a refractive index higher than the silicon-based or acryl-based resin configuring the resin layer 230 so as to scatter or refract the light emitted from the light source 220.

For example, the scattering particles 231 may be configured by polymethylmethacrylate/styrene copolymer (MS), polymethylmethacrylate (PMMA), polystyrene (PS), silicon, titanium dioxide ($TiO_2$), silicon dioxide ($SiO_2$), etc. and by combining the materials.

The scattering particles 231 may be configured by a material having a refractive index lower than the material configuring the resin layer 230 and for example by forming the bubble in the resin layer 230.

The material configuring the scattering particle 231 is not limited to the above-mentioned materials, and may be configured by using various polymer materials or inorganic particles other than the above-mentioned materials.

The resin layer 230 may be formed by mixing the scattering particles 231 with the liquid-type or gel-type resin, and applying and curing them to the top of the first layer 210 where the plurality of light sources 220 and the reflection layer 240 are formed.

As shown in FIG. 11, an optical sheet 250 may be provided on the top of the resin layer 230. The optical sheet 250 may include one or more prism sheets 251 and/or one or more diffusion sheets 252.

A plurality of sheets included in the optical sheet 250 may be provided while being closely bonded or attached to each other each other without being separated from each other, such that it is possible to minimize thickness of the optical sheet 250 or the backlight unit 200.

The bottom of the optical sheet 250 may be closely attached to the resin layer 230 and the top of the optical sheet 250 may be closely attached to the bottom of the display panel 100 (i.e., the lower polarizer 140).

The diffusion sheet 252 prevents light emitted from the resin layer 230 from being partially focused by diffusing the incident light to thereby make luminance of the light more uniform. The prism sheet 251 may allow the light to be vertically inputted into the display panel 100 by focusing the light emitted from the diffusion sheet 252.

The optical sheet 250, for example, at least one of the prism sheet 251 and the diffusion sheet 252 may be removed or the optical sheet 250 may be configured by including various functional layers in addition to the prism sheet 251 and the diffusion sheet 252.

A plurality of holes (not shown) may be formed at positions of the reflection layer 240 corresponding to the plurality of light sources 220 and the plurality of light sources 220 mounted on the lower substrate 210 may be inserted into the holes.

The light sources 220 may be inserted on the bottom through the holes formed in the reflection layer 240 and at least some of the light sources 220 may protrude on the top of the reflection layer 240.

As such, it may be possible to further improve fixability between the substrate 210 mounted with the light sources 220 and the reflection layer 240 by configuring the backlight unit 200 by using the structure in which the light sources 220 are inserted into the holes of the reflection layer 240.

Each of the plurality of light sources 220 provided in the backlight unit 200 has the light emitting surface on the lateral surface thereof and may emit light in a lateral direction, for example, a direction in which the substrate 210 or the reflection layer 240 extends.

For example, the plurality of light sources 220 may be configured by using the side view-scheme LED package. As a result, it is possible to prevent the light source 220 from being observed as a hot spot on a screen and slim the backlight unit 200, furthermore, the display apparatus by reducing thickness a of the resin layer 230.

Figure 12:
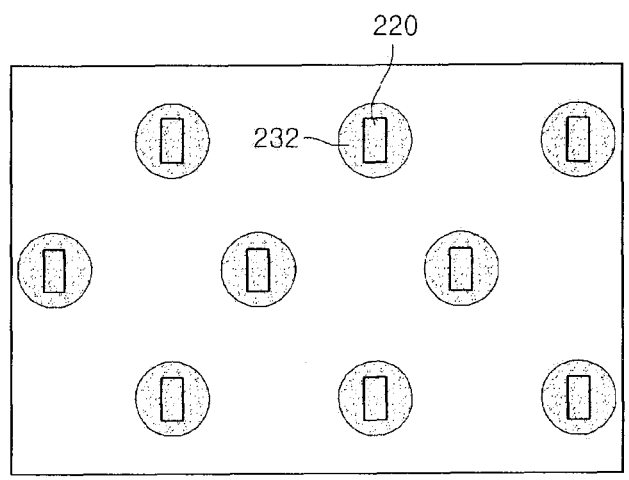

As shown in FIG. 12, the pattern layer including a plurality of patterns 232 may be formed on the top of the resin layer 230 of the backlight unit 200 including the light sources 220. More specifically, the plurality of patterns 232 included in the pattern layer may be formed on the resin layer 230 to correspond to the position at which the light sources 220 are provided.

For example, the patterns 232 formed on the top of the resin layer 230 may be a reflection pattern that reflects at least a part of light emitted from the light source 220.

As shown in FIG. 12, luminance of light emitted from a region adjacent to the light source 220 may be reduced by forming the reflection pattern 232 on the resin layer 230 to cause the backlight unit 200 to emit light having uniform luminance.

That is, the reflection pattern 232 is formed on the resin layer 230 to correspond to the position where the plurality of light sources 220 to reduce the luminance of light emitted from the region adjacent to the light source 220 by optionally reflecting light emitted toward the top from the light source 220. The reflected light may be diffused to the lateral direction.

More specifically, the light emitted toward the top from the light source 220 is reflected toward the bottom while being diffused in the lateral direction by the reflection pattern 232 and the light reflected on the reflection pattern 232 may be reflected toward the top while being diffused in the lateral direction by the reflection layer 240 again. That is, the reflection pattern 232 may fully reflect the incident light or partially reflect the incident light and partially pass the incident light. As such, a characteristic of the reflection pattern 232 may be adjusted by controlling transferring of the light through the resin layer 230 and the reflection pattern 232.

As a result, the light emitted from the light source 220 may widely be diffused in the lateral direction and other directions without concentrating on the upper direction so as to allow the backlight unit 200 to emit the light having the more uniform luminance.

The reflection pattern 232 includes a reflection material such as metal, or the like. For example, the reflection pattern 232 may include metal such as aluminum, silver, gold, and/or the like having reflectance of 90% or more. For example, the reflection pattern 232 may be configured by a material or a shape to allow approximately 10% or less of the entire incident light to be transmitted and the rest of the entire incident light to be reflected.

The reflection pattern 232 may be formed by depositing or coating the metal. As another method, the reflection pattern 232 may be formed by performing a printing operation using reflection ink including the metal, for example, silver ink in accordance with a predetermined pattern.

Further, in order to improve a reflection effect of the reflection pattern 232, a color of the reflection pattern 232 may have a color having high brightness, for example, a color close to a white color. More specifically, the reflection pattern 232 may have a color having higher brightness than the resin layer 230.

The reflection pattern 232 may include metal oxide. For example, the reflection pattern 232 may include titanium dioxide ($TiO_2$). More specifically, the reflection pattern 232 may be formed by performing the printing operation using reflection ink including titanium dioxide ($TiO_2$).

The example where the plurality of reflection patterns 232 are formed to correspond to positions of the light sources 220 may include an example where a center of the reflection pattern 232 is formed to coincide with a center of the light source 220 corresponding to the center of the light reflection pattern 232 and an example where the center of the reflection pattern 232 is spaced apart from the center of the light source 220 corresponding thereto by a predetermined gap as shown in FIG. 12.

Figure 13:
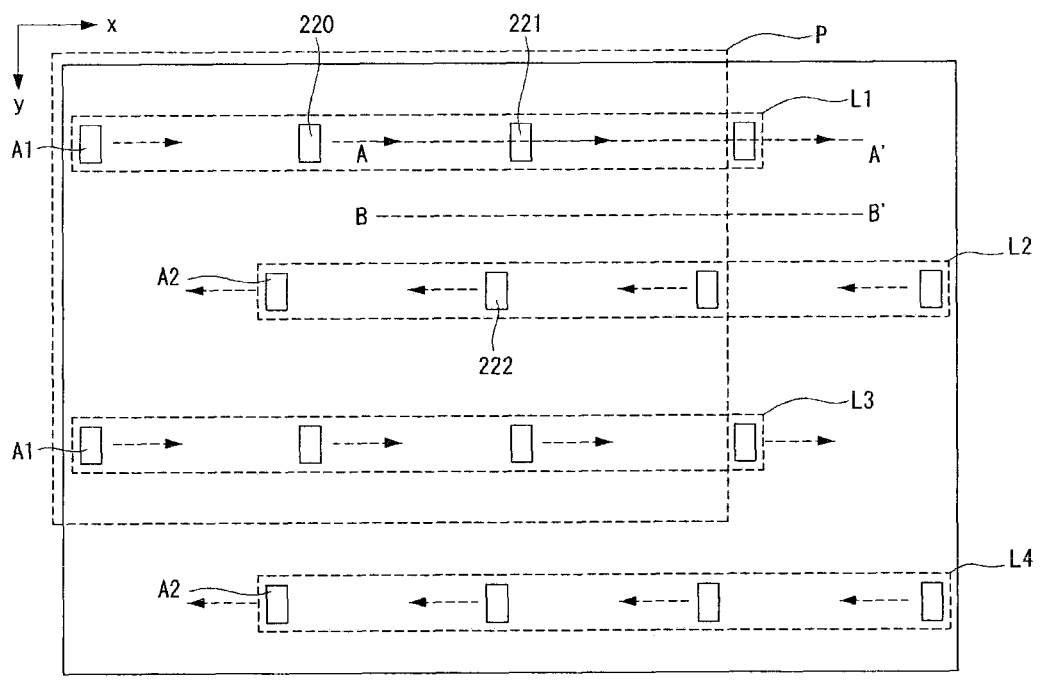

As shown in FIG. 13, the plurality of light sources 220 and 221 included in the backlight unit 200 may be provided by being divided into a plurality of arrays (i.e., a first light source array A1 and a second light source array A2).

Each of the first light source array A1 and the second light source array A2 may include a plurality of light source lines that are each constituted by the light sources. For example, the first light source array A1 may be formed by a plurality of lines L1 each including two or more light sources and the second light source array A2 may be formed by a plurality of lines L2 each including two or more light sources.

The light sources included in the first light source array A1 and the light sources included in the second light source array A2 may alternately be provided each other to correspond to the display region of the display panel 100.

According to an exemplary embodiment, the first light source array A1 may include odd number-th light source lines from the top among the plurality of light source lines constituting the plurality of light sources and the second light source array A2 may include even number-th light source lines from the top.

The first light source line L1 included in the first light source array A1 and the second light source line L2 included in the second light source array A2 may be vertically provided adjacent to each other and the first light source line L1 and the second light source line L2 may be alternately provided each other to configure the backlight unit 200.

The light source 220 included in the first light source array A1 and the light source 222 included in the second light source array A2 may emit light in the same direction or in different directions.

As shown in FIG. 13, the backlight unit 200 may include two or more light sources that emit light in different directions.

That is, the light sources 220 included in the first light source array A1 and the light sources 222 included in the second light source array A2 may emit light in different directions. For this, a direction which light emitting surfaces of the light sources 220 included in the first light source array A1 face may be different from a direction which light emitting surfaces of the light sources 222 included in the second light source array A2 face.

More specifically, the light emitting surfaces of the first light source 220 and the second light source 221 included in the first light source array A1 and the light emitting surface of the third light source 222 included in the second light source array A2 may face in directions opposite to each other. Therefore, the first light source 220 and the second light source 221 included in the first light source array A1 and the third light source 222 included in the second light source array A2 may emit light in directions opposite to each other.

In this example, the light sources provided in the backlight unit 200 may emit the light in the lateral direction. For this, the light sources may be configured by using the side view-scheme LED package.

The plurality of light sources provided in the backlight unit 200 may be provided while forming two or more lines and two or more light sources provided on the same line may emit the light in the same direction.

For example, the second light source 221 adjacent to the first light source 220 may also emit the light in the same direction as the first light source 220 (i.e., in the x-axis direction) and the light sources adjacent to the third light source 222 may also emit the light in the same direction as the third light source 222 (i.e., in a direction opposite to the x-axis direction).

As described above, by making the light emitting directions of light sources disposed in a y-axis direction (i.e., the second light source 221 and the third light source 222 being opposite to each other), luminance of the light may be prevented from being focused or being weakened in a predetermined region of the backlight unit 200.

That is, as the light emitted from the second light source 221 advances to the adjacent light source, the light may be weakened. As a result, as the light is further spaced apart from the second light source 221, the luminance of the light emitted in the direction of the display panel 100 may weaken.

Accordingly, by making the light emitting directions of the second light source 221 and the third light source 222 be opposite to each other, the focusing of the luminance of the light in the region adjacent to the light source and the weakening of the luminance of the light in the region further spaced apart from the light source may complement each other, thereby maintaining the luminance of the light emitted from the backlight unit 200 uniformly.

Further, in the example of the first light source line L1 included in the first light source array A1 and the second light source line L2 included in the second light source array A2, right and left positions of the light sources do not coincide with each other but cross each other. As a result, it may be possible to improve uniformity of the light emitted from the backlight unit 200.

That is, the third light source 222 included in the second light source array A2 may be provided adjacent to the first light source 220 or the second light source 221 included in the first light source array A1 in a diagonal direction.

FIGS. 14 to 21 are enlarged diagrams of region P of FIG. 13.

Figure 14:
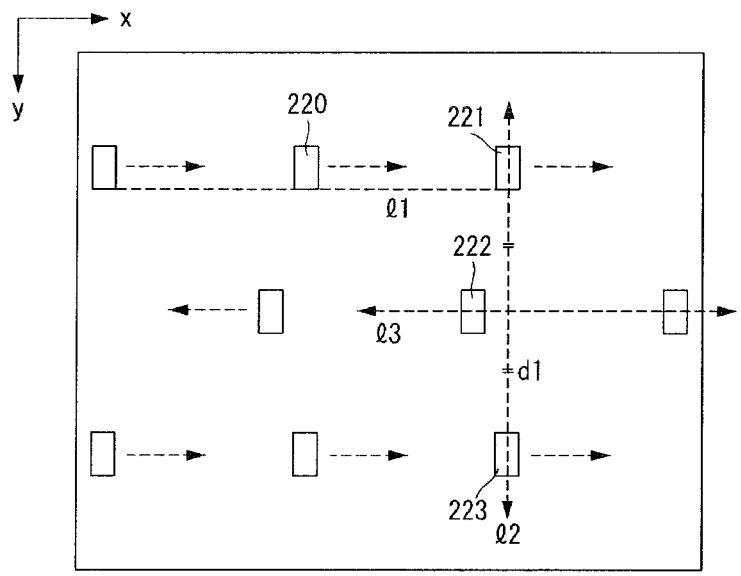
Figure 15:
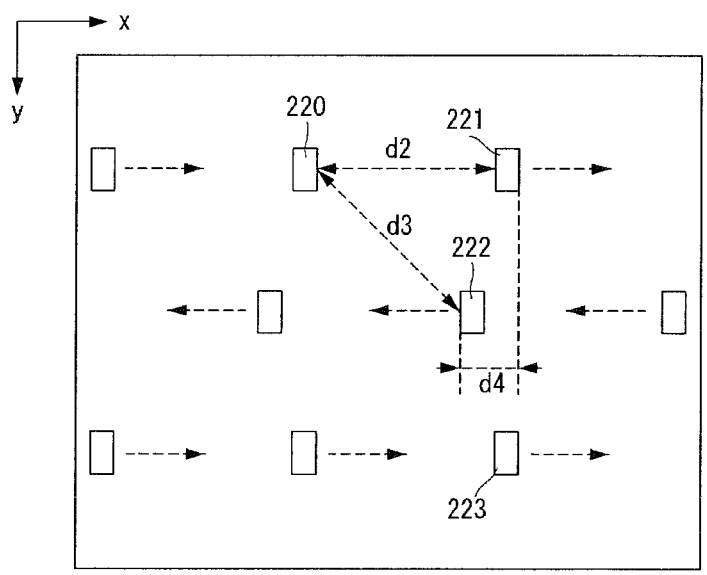

As shown in FIGS. 14 and 15, two light source lines vertically adjacent to each other, which are included in the first light source array A1 and the second light source array A2, respectively (i.e., the first light source line L1 and the second light source line L2) may be spaced apart from each other by a predetermined gap.

The first light source 220 that emits light in one direction may be provided in the first light source array A1. In addition, the second light source 221 that is provided adjacent to the first light source 220 and provided on the same horizontal line l1 as the first light source 220 and emits light in the same direction as the first light source 220 may be provided. The horizontal line l1 may be a line that extends in the x-axis direction.

The third light source 222 that emits light in a direction opposite to the first light source 220 may be provided in the second light source array A2. The third light source 222 may be provided between the first light source 220 and the second light source 221 and may be provided on a diagonal line to the first light source 220 or the second light source 221.

Additionally, a third light source line L3 formed in the first light source array A1 may be spaced apart from the second light source line L2 by a predetermined gap. A fourth light source 223 that emits light in the same direction as the second light source 221 and is provided on a line l2 vertical to the light emitting direction and vertical to the second light source 221 in the third light source line L3.

The third light source 222 may be provided between the second light source 221 and the fourth light source 223 and may be provided on a horizontal line l3 that bisects a distance d1 between the second light source 221 and the fourth light source 223.

The third light source 222 may be provided adjacent to the line l2 vertical to the second light source 221 and may be provided in a direction opposite to the light emitting direction of the second light source 221.

A light orientation angle θ from the light source and a light orientation angle θ' in the second layer 230 may be have a relationship as shown in Equation 1 by the Snell's law.

$$\frac{n1}{n2} = \frac{\sin\theta'}{\sin\theta}$$ [Equation 1]

By considering that a part that emits the light from the light source is an air layer (refractive index n1 is '1') and an orientation angle θ of the light emitted from the light source may be 60 degrees, the light orientation angle θ' in the second layer 230 may have a value shown in Equation 2 in accordance with Equation 1.

$$\sin\theta' = \frac{\sin 60°}{n2}$$ [Equation 2]

Further, when the second layer 230 is made of an acrylic resin-based material such as polymethyl methacrylate (PMMA), the second layer 230 has a refractive index of approximately 1.5. Therefore, the light orientation angle θ' in the second layer 230 may be approximately 35.5 degrees in accordance with Equation 2.

As described by referring to Equations 1 and 2, the light orientation angle θ' of the light emitted from the light source in the second layer 230 may be less than 45 degrees. As a result, a range in which the light emitted from the light source advances in the y-axis direction may be smaller than a range in which the light advances in the x-axis direction.

The third light source 222 may be provided on a horizontal line l3 that bisects the distance d1 between the light source 221 and the fourth light source 223. As a result, luminance of the light emitted from the backlight unit 200 may be uniform.

Meanwhile, as shown in FIG. 15, the first light source 220, the second light source 221, and the third light source 222 may be positioned to be spaced apart from each other by a predetermine distance.

More specifically, the first light source 220 and the second light source 221 may have a first distance d2, which is a distance between surfaces opposite to the light emitting surface of the first light source 220 and the light emitting surface of the second light source 221. Additionally, the first light source 220 and the third light source 222 may have a second distance d3, which is a distance between the center of the light emitting surface of the first light source 220 and the center of the light emitting surface of the third light source 222. The second light source 221 and the third light source 222 may have a third distance d4, which is a horizontal distance between the light emitting surface of the second light source 221 and the light emitting surface of the third light source 222.

The first distance d2, which is the distance between the center of the light emitting surface of the first light source 220 and the center of the opposite surface to the light emitting surface of the second light source 221, may be smaller than or the same as the second distance d3, which is the distance between the center of the light emitting surface of the first light source 220 and the center of the light emitting surface of the third light source 222.

When the first distance d2, which is the distance between the center of the light emitting surface of the first light source 220 and the center of the opposite surface to the light emitting surface of the second light source 221, is smaller than the second distance d3, which is the distance between the center of the light emitting surface of the first light source 220 and the center of the light emitting surface of the third light source 222, a region in which the light emitted from the first light source 220 and the light emitted from the third light source 222 are overlapped with each other is reduced to prevent nonuniform luminance. The third distance d4, which is a horizontal distance between the light emitting surface of the second light source 221 and the light emitting surface of the third light source 222, is reduced to prevent luminance in a region between the second light source 221 and the third light source 222 from being decreased.

Figure 16:
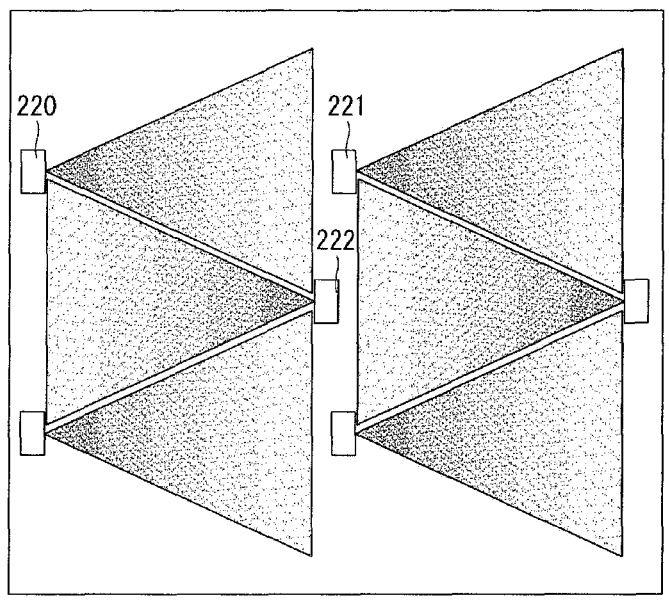

In other words, as shown in FIG. 16, it is possible to prevent nonuniform luminance by removing the region in which the light emitted from the first light source 220 and the light emitted from the third light source 222 are overlapped with each other.

When the first distance d2, which is the distance between the center of the light emitting surface of the first light source 220 and the center of the opposite surface to the light emitting surface of the second light source 221, is the same as the second distance d3, which is the distance between the center of the light emitting surface of the first light source 220 and the center of the light emitting surface of the third light source 222, the region in which the light emitted from the first light source 220 and the light emitted from the third light source 222 are overlapped with each other may be minimized and the third distance d4, which is the horizontal distance between the light emitting surface of the second light source 221 and the light emitting surface of the third light source 222 may be maximized. That is, overlapping of the light may be minimized between the first light source 220 and the third light source 222 and a dark portion may be minimized in a region between the second light source 221 and the third light source 222.

Figure 17:
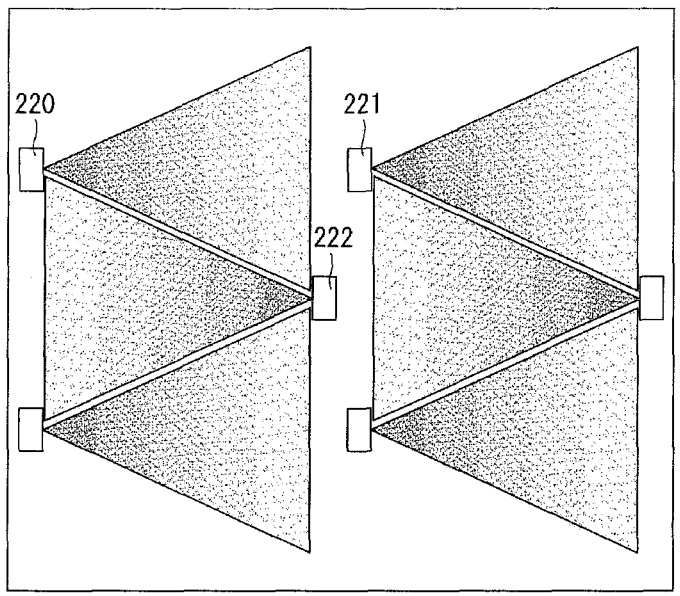

In other words, as shown in FIG. 17, the region in which the light emitted from the first light source 220 and the light emitted from the third light source 222 are overlapped with each other may be minimized and luminance in the region between the second light source 221 and the third light source 223 may be minimized from being decreased.

Accordingly, the backlight unit according to the exemplary embodiment may provide uniform luminance throughout an entire surface of the backlight unit.

Figure 18:
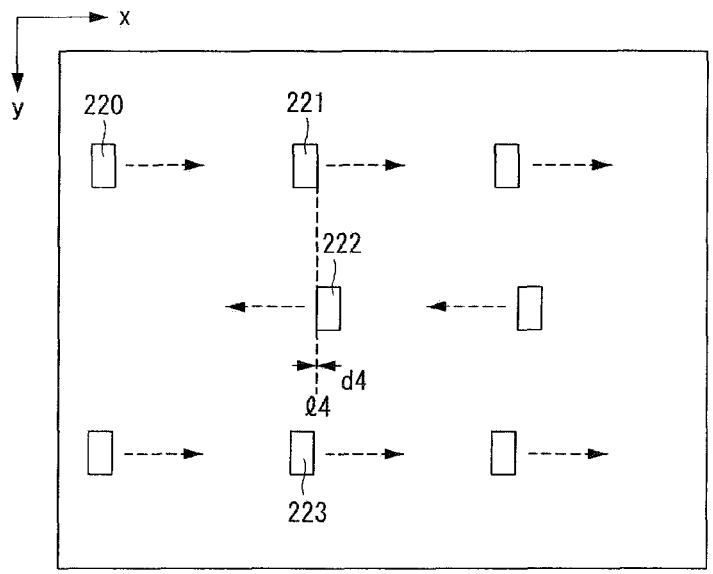
Figure 19:
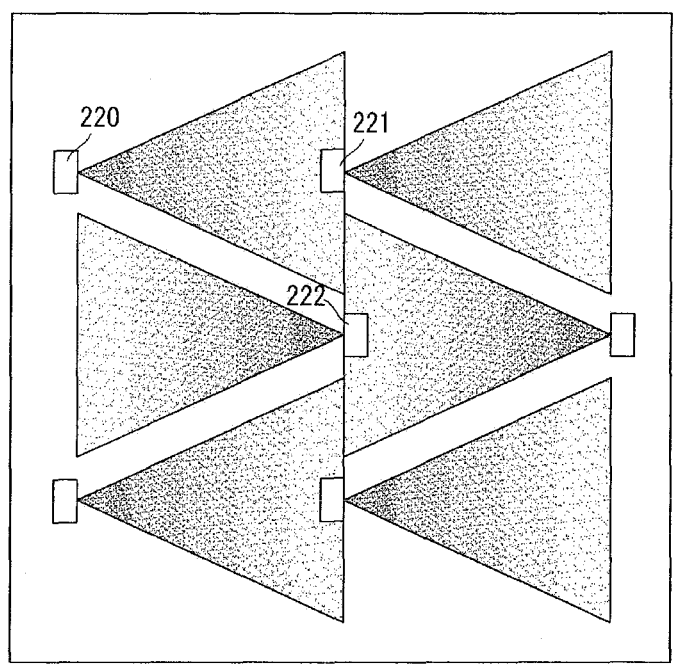

Further, as shown in FIGS. 18 and 19, the second light source 221 and the third light source 222 may be provided so that the light emitting surface of the second light source 221 and the light emitting surface of the third light source 222 are positioned on the same vertical line l4. That is, the third distance d4, which is the distance between the light emitting surface of the second light source 221 and the light emitting surface of the third light source 222, may be minimized.

Accordingly, as shown in FIG. 19, it may be possible to provide the backlight unit 200 having higher luminance uniformity by preventing a dark portion from being generated between the light emitting surface of the second light source 221 and the light emitting surface of the third light source 222.

Meanwhile, in the backlight unit, a first layer 210 where the light source 220 is provided may be divided into a plurality of layers.

Figure 20:
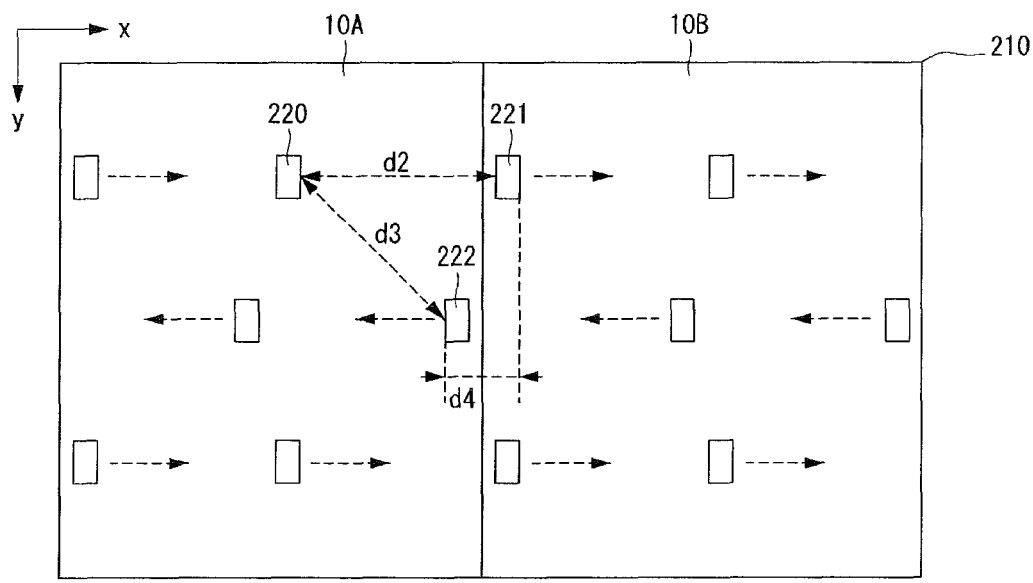
Figure 21:
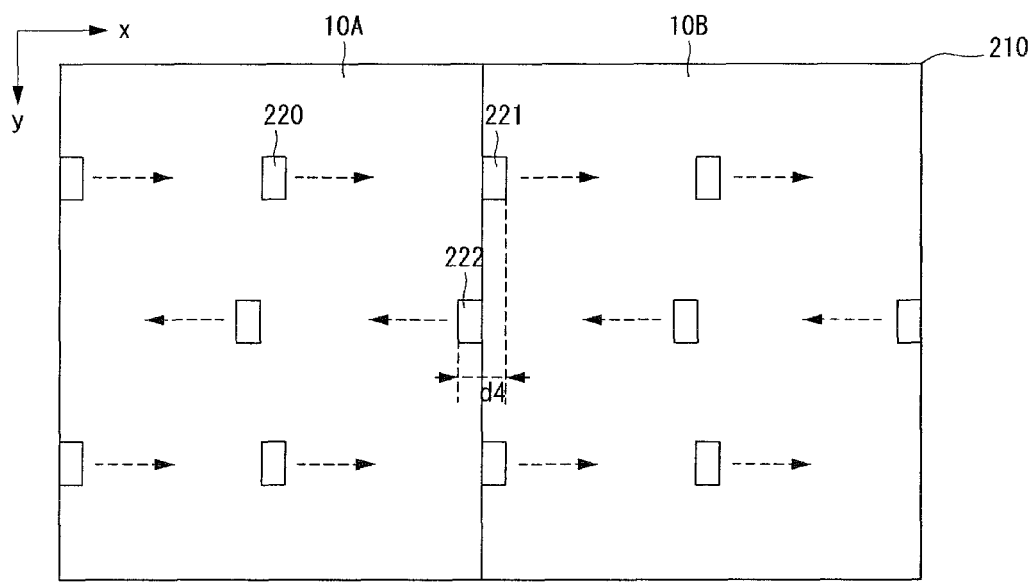

FIGS. 20 and 21 are diagrams illustrating a backlight unit including two or more first layers 210.

As shown in FIG. 20, a first optical assembly 10A and a second optical assembly 10B each where a plurality of light sources 220, 221, and 222 are provided on the first layers 210 may be provided to contact each other. The plurality of light sources provided in each of the first optical assembly 10A and the second optical assembly 10B may be provided in the same array.

More specifically, the first light source 220 that emits light in one direction may be provided in the first optical assembly 10A and the third light source 222 that is positioned on a diagonal line to the first light source 220 and emits light in a direction opposite to the light emitting direction of the first light source 220 may be provided in the first optical assembly 10A.

Additionally, the second light source 221 that is provided on the same horizontal line as the light source 220 and emits light in the same direction as the first light source 220 may be provided in the second optical assembly 10B.

As shown in FIG. 15, the first distance d2, which is the distance between the center of the light emitting surface of the first light source 220 and the center of the opposite surface to the light emitting surface of the second light source 221, may be smaller than or the same as the second distance d3, which is the distance between the center of the light emitting surface of the first light source 220 and the center of the light emitting surface of the third light source 222.

Further, as shown in FIG. 20, the third light source 222 provided in the first optical assembly 10A may be provided to contact the side of the first optical assembly 10A and the second light source 221 provided in the second optical assembly 10B may be provided to contact the side of the second optical assembly 10B.

The third distance d4, which is the distance between the light emitting surface of the second light source 221 and the light emitting surface of the third light source 222, may be equal to the sum of the widths of the second light source 221 and the third light source 222.

In particular, each of the second light source 221 and the third light source 222 may have a width in the range of approximately 1 to 2 mm. Therefore, in the example of the backlight unit including the plurality of optical assemblies, minimum distance of the third distance d4, which is the distance between the light emitting surface of the second light source 221 and the light emitting surface of the third light source 222, may be equal to the sum of the widths of the second light source 221 and the third light source 222.

Figure 22:
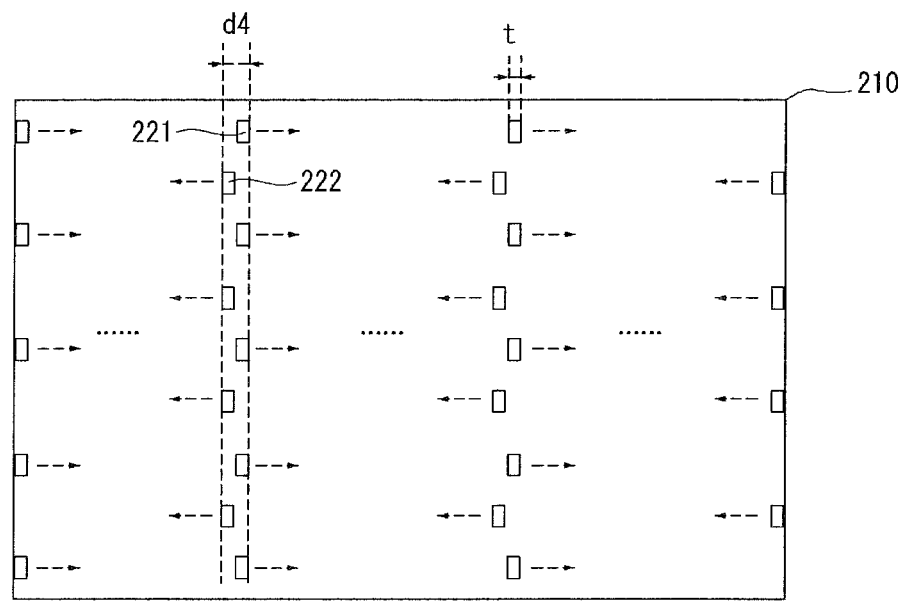
Figure 23:
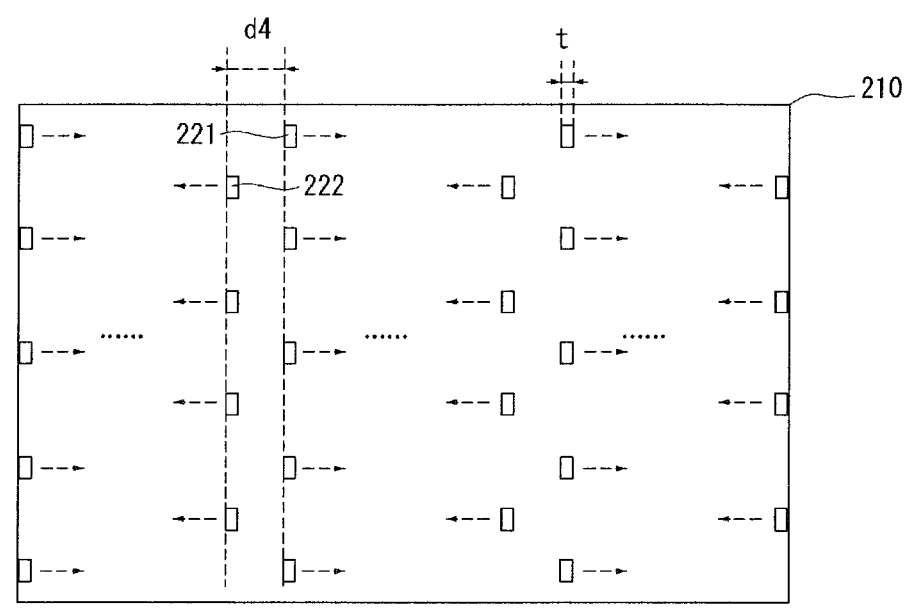

As shown in FIGS. 22 and 23, the third distance d4, which is the distance between the light emitting surface of the second light source 221 and the light emitting surface of the third light source 222, may be larger than or the same as the sum 2t of the widths t of the second light source 221 and the third light source 222 and smaller than or the same as 10 times 10t of the widths t of the light sources 221 and 222. That is, d4 may be in the range of 2t to 10t, and more preferably d4 may be in the range of 3t to 8t.

As a result, the third distance d4, which is a horizontal distance between the light emitting surface of the second light source 221 and the light emitting surface of the third light source 222, may be reduced to prevent luminance in a region between the second light source 221 and the third light source 222 from being decreased.

Accordingly, the backlight unit may have a backlight unit having higher luminance uniformity by preventing nonuniform luminance between the first light source 220 and the third light source 222 or between the light second light source 221 and the third light source 222 as described above.

Figure 24:
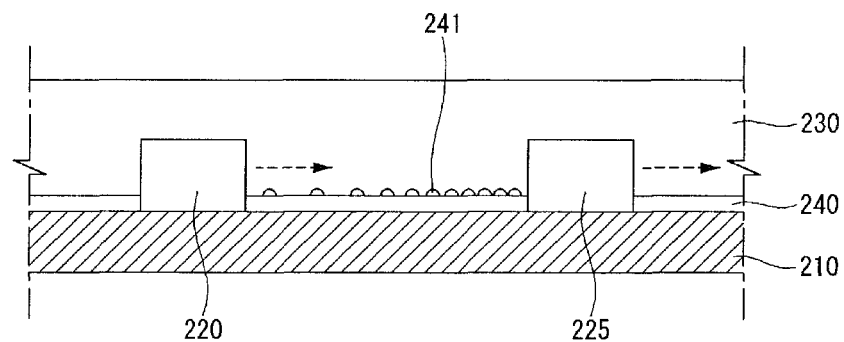
Figure 25:
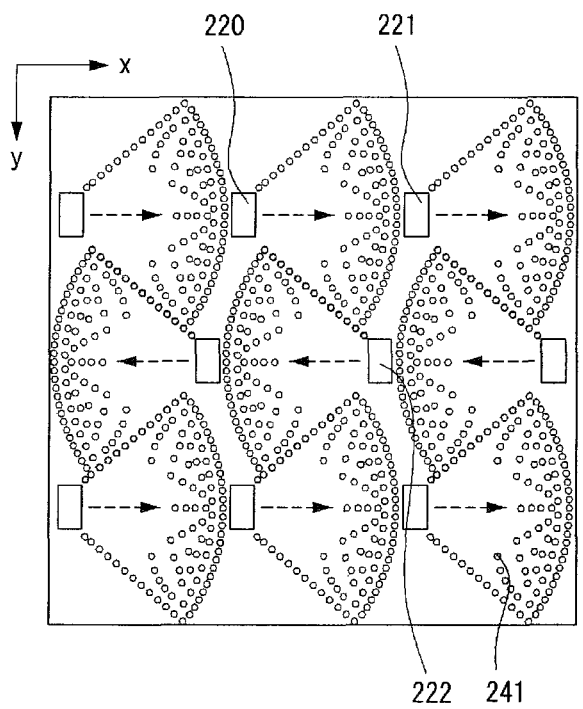

FIGS. 24 and 25 are diagrams illustrating a backlight unit according to an exemplary embodiment of the present invention.

As shown in FIG. 24, in the backlight unit, a plurality of diffusion patterns 241 for facilitating the light emitted from the light source 220 to advance up to the adjacent light source 225 may be formed on the reflection layer 240. The plurality of patterns 241 may diffuse or refract the light emitted from the light source 220.

More specifically, as shown in FIG. 25, the backlight unit 200 may include two or more light sources that emit light in different directions.

The backlight unit 200 may include the first light source 220 and the second light source 221 that side-emit the light in a direction parallel to an x axis (i.e., the same direction). Additionally, the third light source 222 that is arranged vertical to the x-axis direction in which the first light source 220 is arranged and emits light in a direction opposite to the first light source 220 may be provided. That is, the lines on which the first light source 220 and the second light source 221 and the lines on which the third light source 222 is arranged cross each other.

Accordingly, by making the light emitting directions of the first light source 220 and the second light source 221 and the third light source 222 be opposite to each other, it is possible to prevent the luminance of the light from being focused or being weakened in a predetermined region of the backlight unit 200.

In this case, as the light emitted from each of the light sources 220, 221, and 222 advances, the luminance may be deteriorated. As a result, as it is further spaced apart from each of the light sources 220, 221, and 222, the luminance of light emitted toward the display panel from the corresponding region may deteriorate.

Therefore, the plurality of diffusion patterns 241 may be provided among the light sources 220, 221, and 222. The plurality of diffusion patterns 241 diffuse or refract the light emitted from each of the light sources 220, 221, and 222 to allow the light having uniform luminance to be emitted from the backlight unit 200.

The plurality of diffusion patterns 241 may include at least one of metal or metal oxide which is the reflection material and for example may be configured to include metal or metal oxide having high reflectance such as aluminum (Al), silver (Ag), gold (Au) titanium dioxide ($TiO_2$).

The plurality of diffusion patterns 241 may be formed by depositing or coating the metal or metal oxide on the first layer 210 and may be formed by printing metal ink. As the deposition method, a vacuum deposition method such as a thermal deposition method, an evaporation method, and/or a sputtering method and as the coating or printing method, a printing method, a gravure coating method, and/or a silk screen method may be used.

In order to improve a diffusion or refraction effect of the plurality of diffusion patterns 241, the plurality of diffusion patterns 241 may have colors having high brightness (i.e., colors close to a white color).

Additionally, the plurality of diffusion patterns 241 may be formed by a plurality of dots each including the material. For example, the plane shapes of the plurality of diffusion patterns 241 may be formed by circular dots and may be oval or polygonal.

Density of the plurality of diffusion patterns 241 may increase toward another adjacent light source from one light source. For example, the density may increase toward the second light source 221 from the first light source 220. As a result, it is possible to prevent the luminance of light emitted toward the top from a region that is far off from the first light source 220 (i.e., a rear surface region of the second light source 221 from being decreased), and as a result it is possible to maintain the luminance of the light provided from the backlight unit 200 uniformly.

For example, in the example of the plurality of diffusion patterns 241 formed by the dots, a gap between two adjacent diffusion patterns may increase toward the second light source 221 from the light emitting surface of the first light source 220. As a result, the light emitted from the first light source 220 is diffused or refracted toward the second light source 221 to maintain uniform luminance.

In particular, the plurality of diffusion patterns 241 may not almost exist in a region adjacent to each of the light sources 220, 221, and 222. As a result, the light emitted from the light sources 220, 221, and 222 may be fully reflected and moved by the lower reflection layer 240 in the region where the diffusion patterns 241 do not exist and diffused or refracted in the region where the diffusion patterns 241 exist to maintain the luminance of the entire region including the region adjacent to the light sources 220, 221, and 222 uniformly.

Additionally, the plurality of diffusion patterns 241 may be provided in line on a diagonal line between the first light source 220 and the third light source 222. As a result, since the direction of the light emitted from the first light source 220 and the direction of the light emitted from the third light source 222 are different from each other, the luminance may increase in a region where the light of the first light source 220 and the light of the third light source 222 may overlap with each other. Accordingly, the plurality of diffusion patterns 241 are positioned on the diagonal line of the first light source 220 and the third light source 222 to prevent the luminance from being increased in the overlapping region of the light.

Therefore, as shown in FIG. 25, a plane shape formed by the plurality of diffusion patterns 241 provided in the emission direction of the light of the first light source 220 may be symmetric to a plane shape formed by the plurality of diffusion patterns 241 provided in the emission direction of the light of the third light source 222.

For example, the plane shape formed by the plurality of diffusion patterns 241 provided in the emission direction of the light of each of the first light source 220 and the third light source 222 may be a fan shape.

The fan shape may be provided to correspond to an orientation angle of the light emitted from the light source of approximately 120 degrees, such that it is possible to maintain the overall luminance of the backlight unit uniformly by efficiently transferring and diffusing the light emitted from the light source.

Figure 26:
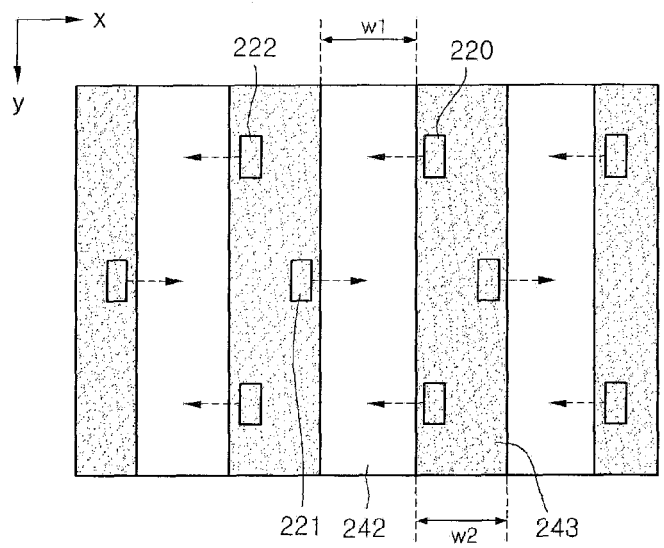

As shown in FIG. 26, the reflection layer 240 provided in the backlight unit 200 may have two or more reflectances. For example, the reflection layer 240 may have different reflectances depending on a position where the reflection layer 240 is formed. That is, the reflection layer 240 may include two or more regions having difference reflectances.

As shown in FIG. 26, the reflection layer 240 may include a first reflection layer 242 and a second reflection layer 243 that have different reflectances. The reflection layer 240 may be formed by alternately providing the first and second reflection layers 242 and 243 having different reflectances.

For example, the reflectances of the first and second reflection layers 242 and 243 may be implemented to be different by configuring the first and second reflection layers 242 and 243 by reflection sheets made of different materials or by adding a predetermined material to any one of the first and second reflection layers 242 and 243 configured by the same reflection sheet or processing the surface.

The first and second reflection layers 242 and 243 may be configured by one reflection sheet, which is not physically separated. In this example, the first and second reflection layers 242 and 243 having different reflectances may be formed by forming a pattern for adjusting the reflectance in at least a part of the reflection sheet.

That is, it is possible to adjust the reflectance by forming the pattern in at least one area of the reflection layer 240 corresponding to the first reflection layer 242 and an area of the reflection layer 240 corresponding to the second reflection layer 243. For example, by forming the pattern in an area of the reflection layer 240 configured by one sheet corresponding to the second reflection layer 243 shown in FIG. 26, it is possible to adjust the reflectance of the corresponding area.

More specifically, protruded patterns for diffusing light may be formed on the top of the area of the reflection layer 240 corresponding to the second reflection layer 243, thereby reducing reflectance of the area corresponding to the second reflection layer 243. In this example, a light diffusion effect may be improved in the area of the reflection layer 240 corresponding to the second reflection layer 243. As a result, light emitted from the light source 220 may be uniformly diffused to an area disposed in the adjacent light source 222.

The surface roughnesses of the first and second reflection layers 242 and 243 may be different from each other. For example, by making the surface roughness of the second reflection layer 243 be higher than that of the first reflection layer 242, the reflectance of the second reflection layer 243 may be lower than that of the first reflection layer 242.

The first reflection layer 242 of the first and second reflection layers 242 and 243 adjacent to the light sources 220, 221, and 222 may be configured by a specular reflection sheet based on the light emitting direction and the second reflection layer 243 can be configured by a diffuse reflection sheet.

Incident light may be reflected on the smooth surface of the specular reflection sheet, such that an incident angle and a reflection angle may be the same as each other. Therefore, the first reflection layer 242 may allow light obliquely inputted from the light sources 220, 221, and 222 to advance in a direction orienting the adjacent light source by reflecting the light at the reflection angle equal to the incident angle.

In the diffuse reflection sheet, the incident light may be observed as reflected and diffused at various angles due to diffused reflection generated on a rough surface with unevenness. Therefore, the second reflection layer 243 may emit upward by diffusing the light advancing after being emitted from the light sources 220, 221, and 222.

The second reflection layer 243 configured by the diffuse reflection sheet may be formed by forming unevenness by processing the surface of the reflection sheet or applying or adding a diffuse reflection material (i.e., titanium dioxide ($TiO_2$)) with predetermined density.

In this example, the reflectance of the first reflection layer 242 may be higher than the reflectance of the second reflection layer 243. Therefore, as described above, the light inputted from the light sources 220, 221, and 222 may be specularly reflected at the same reflection angle in the first reflection layer 242 and the diffuse reflection is generated, such that the light may be emitted upward in the second reflection layer 243.

As described above, the light emitted from the light sources 220, 221, and 222 may effectively advance to the adjacent light source by configuring the first reflection layer 242 adjacent to the light sources 220, 221, and 222 by the specular reflection sheet having high reflectance based on the light emitting direction. Therefore, it is possible to prevent the luminance of the light from being focused in the region adjacent to the light sources 220, 221, and 222 and the luminance of the light from being decreased in the region remotely spaced from the light sources 220, 221, and 222.

The advancing light may effectively be emitted to the display panel 100 by configuring the second reflection layer 243 remotely spaced from the light sources 220, 221, and 222 by the diffuse reflection sheet having comparatively low reflectance based on the light emitting direction. Therefore, it is possible to prevent the luminance of the light from being decreased in the region remotely spaced from the light sources 220, 221, and 222 by compensating the luminance reduced while the light emitted from the light sources 220, 221, and 222 advances up to the adjacent light sources.

Meanwhile, a specular reflection sheet forming the first reflection layer 242 specularly reflects the light emitted from the light sources 220, 221, and 222 and propagates the light in the direction of the adjacent light source and emits part of the incident light in the direction of the display panel 100 by reflecting or scattering the part of the incident light upwards.

The diffusion reflection sheet forming the second reflection layer 243 may be manufactured by processing the surface of a sheet made of the same material as the specular reflection sheet or by forming the plurality of patterns that protrude on the surface.

The luminance of the light in the region adjacent to the light sources 220, 221, and 222 and the luminance of the light in the region remotely spaced from the light sources 220, 221, and 222 may similarly be adjusted. Therefore, it possible to provide the uniform light luminance to the display panel 100 in the entire region of the backlight unit 200.

The width w1 of the first reflection layer 242 adjacent to the light sources 220, 221, and 222 may be larger than the width w2 of the second reflection layer 243 based on the light emitting direction in order to allow the light emitted from the light sources 220, 221, and 222 to the region where the adjacent light source is provided. However, the width w1 of the first reflection layer 242 may be the same as or smaller than the width w2 of the second reflection layer 243. In this example, the reflectances of the first reflection layer 242 and the second reflection layer 243 may be adjusted in order to achieve the above effect.

As the width w1 of the first reflection layer 242 decreases, progressiveness of the light emitted from the light sources 220, 221, and 222 may deteriorate. As a result, the luminance of the light in the region that is far off from the light sources 220, 221, and 222 may decrease.

Further, when the width w1 of the first reflection layer 242 is still larger than the width w2 of the second reflection layer 243, the light may be focused in the region that is far off from the light sources 220, 221, and 222. For example, the luminance of the light in the middle region between the two adjacent light sources 220 and 222 may be lower than that in the region that is far off from the light sources 220, 221, and 222.

Accordingly, the light emitted from the light sources 220, 221, and 222 effectively advances to the region where the adjacent light source is provided and is emitted upward so as to provide the light having uniform luminance to the display panel 100 in the entire region of the backlight unit 200. For this, the width w1 of the first reflection layer 242 may be 1.1 times to 1.6 times larger than the width w2 of the second reflection layer 243.

As shown in FIG. 26, the first light source 220 and the second light source 221 that are provided adjacent to each other in the y-axis direction may be provided at a position not overlapped with the first reflection layer 242 (i.e., outside of the region where the first reflection layer 242 is formed).

The third light source 222 and the second light source 221 that are adjacent to the first light source 220 in the x-axis direction may be provided in the region where the second reflection layer 243 is formed.

For example, holes (not shown) into which the second light source 221 and the third light source 222 may be inserted may be formed in the second reflection layer 243. As a result, the second and third light sources 221 and 222 mounted on the substrate 210, which is disposed below the second reflection layer 243, protrude upward through the second reflection layer 243 to emit light in the lateral direction.

Meanwhile, since positions of the light sources 220, 221, and 222 shown in FIG. 26 are just one exemplary embodiment, the positional relationship between the light sources 220, 221, and 222, and the first and second reflection layers 242 and 243 may be variable.

Figure 27:
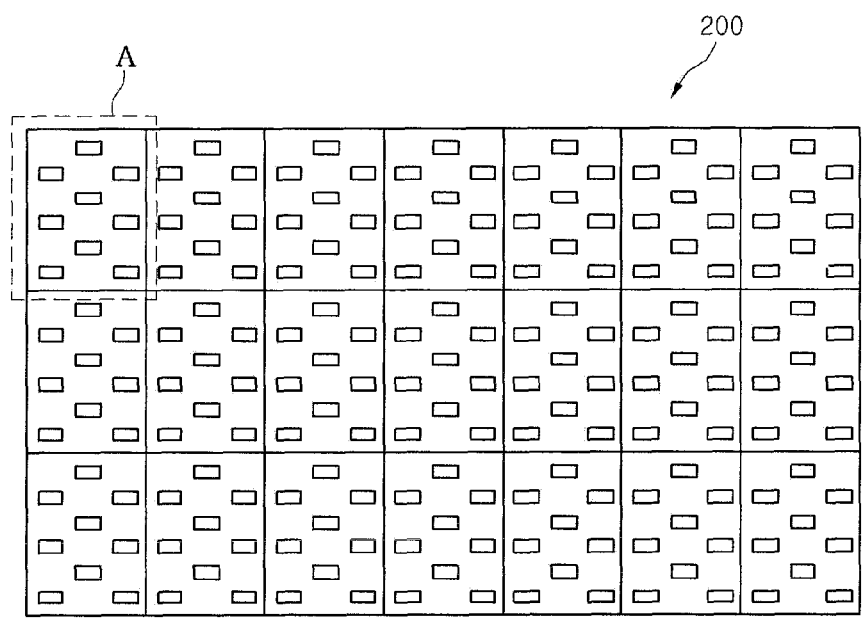
Figure 28:
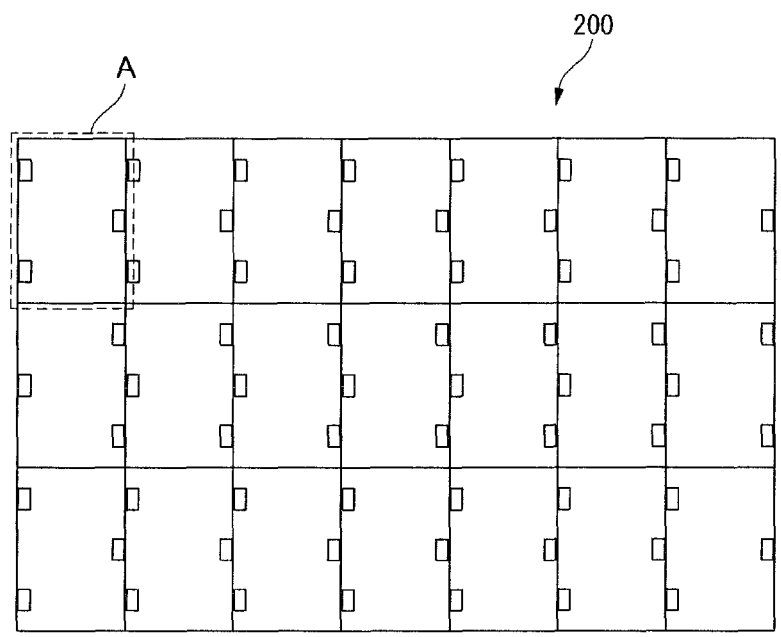

FIG. 27 is a cross-sectional view illustrating a backlight unit according to an exemplary embodiment.

The first layer 210, the plurality of light sources 220 formed on the first layer 210, the second layer 230 covering the plurality of light sources 220, and the reflection layer 240 that are described above with respect to FIGS. 10 to 26 may configure one optical assembly A and the backlight unit 200 may be configured by providing the plurality of optical assemblies A to be adjacent to each other.

In the example of the plurality of optical assemblies A provided in the backlight unit 200, N and M (N or M represents a natural number of 1 or more) optical assemblies may be provided by a matrix type in the x-axis direction and the y-axis direction, respectively.

As shown in FIG. 27, in the backlight unit 200, 21 optical assemblies A may be provided in 7×3 matrix. However, since the configuration shown in FIG. 27 is just one example for describing the backlight unit, embodiments are not limited thereto and may be changed depending on a screen size of the display apparatus, and/or the like.

For example, in the example of a display apparatus having a 47-inch size, the backlight unit 200 may be configured by disposing 240 optical assemblies A in 24×10 matrix.

Each of the optical assemblies A may be fabricated as an independent assembly and the optical assemblies A are adjacent to each other to form a module-type backlight unit. The module-type backlight unit as a backlight means may provide the light to the display panel 100.

As described above, the backlight unit 200 may be driven by a full driving scheme or a partial driving scheme such as local dimming, impulsive, and/or the like. The driving scheme of the backlight unit 200 may be variously changed depending on a circuit design and is not limited thereto. As a result, in the exemplary embodiment, a color contrast ratio is increased and images for a bright part and a dark part may clearly be expressed, such that an image quality is improved.

The backlight unit 200 may operate by being divided into a plurality of division driving regions, and the luminance of the dark part is decreased and the luminance of the bright part is increased by linking the luminance of the division driving region with the luminance of a picture signal, thereby improving a contrast ratio and definition.

For example, it is possible to emit the light upward by independently driving only some of the plurality of optical assemblies A shown in FIG. 27. For this, the light sources 220 included in the each of the optical assemblies A may be independently controlled.

A region of the display panel 100 corresponding to one optical assembly A may be divided into two or more blocks. The display panel 100 and the backlight unit 200 may be separately driven by the unit of a block.

The backlight unit 200 may be divided into a plurality of blocks to be driven for each of the divided blocks, and decrease the luminance of a black part of an image and increase the luminance of a bright part by linking the luminance of each of the divided blocks with the luminance of the video signal so as to improve a contrast ratio and sharpness.

For example, when the backlight unit 200 is driven in a local dimming scheme, the display panel 100 may have a plurality of division regions to correspond to the blocks of the backlight unit 200, respectively. The brightness of the light emitted from each of the blocks of the backlight unit 200 may be adjusted depending on a luminance level of each of the division regions of the display panel 100 (i.e., a peak value of a gray level or a color coordinate signal).

That is, the plurality of light sources included in the backlight unit 200 may be divided into the plurality of blocks and may be driven for each of the divided blocks.

The block is a basic unit to which driving power that allows the backlight unit 200, and more specifically the plurality of light sources provided in the backlight unit 200 to emit the light is supplied. That is, the light sources included in one block are turned on or turned off at a same time and when the light sources are turned on, the light sources may emit light having the same luminance. Further, light sources included in different blocks in the backlight unit 200 may emit light having different luminances by being supplied with different driving powers.

By configuring the backlight unit 200 by assembling the plurality of optical assemblies A, it is possible to simplify a manufacturing process of the backlight unit 200 and improve productivity by minimizing a loss that may be generated in the manufacturing process. Further, the backlight unit 200 has an advantage applicable to backlight units having various sizes through mass production by standardizing the optical assembly A.

When any one of the plurality of optical assemblies A provided in the backlight unit 200 has a failure, only the optical assembly having the failure has to be replaced without replacing the backlight unit 200. Therefore, a replacing work is easy and a part replacement cost is saved.

Since the layout of the optical assembly A and the light sources 220 shown in FIG. 27 is just one exemplary embodiment, embodiments are not limited thereto. For example, the optical assembly A and the light sources 220 provided in the backlight unit 200 may have the configuration shown in FIG. 28.

Figure 29:
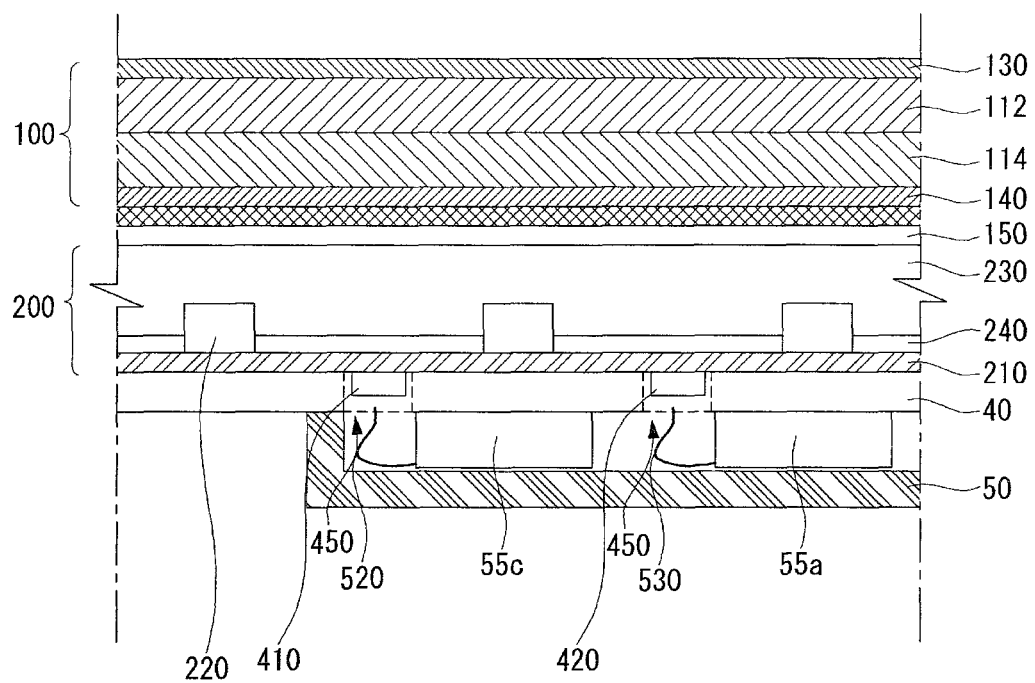
FIG. 29 is a cross-sectional view illustrating a display apparatus according to an exemplary embodiment of the present invention.

FIG. 29 is a cross-sectional view illustrating a display apparatus according to an exemplary embodiment. The same components as described with reference to FIGS. 1 to 28 in the display apparatus shown in FIG. 29 will not be described below.

As shown in FIG. 29, the display panel 100 including the color filter substrate 112, a TFT substrate 114, an upper polarizer 130, and a lower polarizer 140 and the backlight unit 200 including the first layer 210, the plurality of light sources 220, and the second layer 230 may be closely attached to each other.

An adhesion layer 150 may be formed between the backlight unit 200 and the display panel 100, such that the backlight unit 200 may be bonded and attached (or fixed) to the bottom of the display panel 100.

More specifically, the top of the backlight unit 200 may be bonded to the bottom of the lower polarizer 140 by using the adhesion layer 150. The backlight unit 200 may further include a diffusion sheet (not shown) and the diffusion sheet (not shown) may be closely attached to the top of the second layer 230. The adhesion layer 150 may be formed between the diffusion sheet (not shown) of the backlight unit 200 and the lower polarizer 140 of the display panel 100.

The back cover may be provided below the backlight unit 200, and the back cover may be closely attached to the bottom of the first layer 210.

The display apparatus may include the power supply 55c for supplying driving voltage to the display module, and more specifically the display panel 100 and the backlight unit 200. For example, the plurality of light sources 220 provided in the backlight unit 200 may be driven by using voltage supplied from the power supply 55c to emit the light.

The power supply 55c may be provided and attached to the back cover covering the rear surface of the display module 20, such that the power supply 55c may be stably supported and fixed.

A first connector 410 may be formed on the rear surface of the first layer 210. For this, a hole 450 for inserting the first connector 410 may be formed in the back cover.

The first connector 410 may electrically connect the power supply 55c with the light source 220 to allow driving voltage to be supplied from the power supply 55c to the light source 220.

For example, the first connector 410 may formed on the bottom of the first layer 210 and is connected to the power supply 55c through a first cable 520 to allow the driving voltage supplied from the power supply 55c to be transferred to the light source 220 through the first cable 520.

An electrode pattern (not shown) (i.e., a carbon nanotube electrode pattern) may be formed on the top of the first layer 210. The electrode formed on the top of the substrate 210 contacts the electrode formed in the light source 220 to electrically connect the light source 220 with the first connector 410.

The display apparatus may include the driving controller 55a for controlling the driving of the display panel 100 and the backlight unit 200. For example, the driving controller 55a may be a timing controller.

The timing controller may control a driving timing of the display panel 100. More specifically, the timing controller may generate a signal for controlling the driving timings of a data driver (not shown), a gamma voltage generator (not shown), and a gate driver (not shown) that are provided in the display panel 100 to supply the generated signal to the display panel 100.

The timing controller may synchronize with the driving of the display panel 100 and may supply a signal for controlling the driving timing of the light sources 220 to the backlight unit 200, such that the backlight unit 200, and more specifically the light sources 220 operate.

As shown in FIG. 29, the driving controller 55a may be provided and attached to the back cover provided on the rear surface of the display module so as to stably support and fix the driving controller 55a.

A second connector 420 may be formed on the substrate 210. For this, a hole 450 for inserting the second connector 420 may be formed in the back plate.

The second connector 420 may electrically connect the driving controller 55a with the first layer 210 to allow a control signal outputted from the driving controller 55a to be supplied to the first layer 210.

For example, the second connector 420 may be formed on the bottom of the substrate 210 and connected to the driving controller 55a through a second cable 530 to allow the control signal supplied from the driving controller 55a through the second cable 530 to be transmitted to a light source driver.

A light source driver (not shown) may be formed on the first layer 210. The light source driver (not shown) may drive the light sources 220 by using the control signal supplied from the driving controller 55a through the second connector 420.

The power supply 55c and the driving controller 55a are covered by a driver cover to be protected from the outside.

The configuration of the display apparatus shown in FIG. 29 is just one exemplary embodiment. Therefore, positions or numbers of the power supplies 55c, the driving controllers 55a, the first and second connectors 410 and 420, and the first and second cables 520 and 530 may be changed as necessary.

A configuration of a display apparatus according to an exemplary embodiment of the present invention will now be described with respect to FIGS. 30-33.

Figure 30:
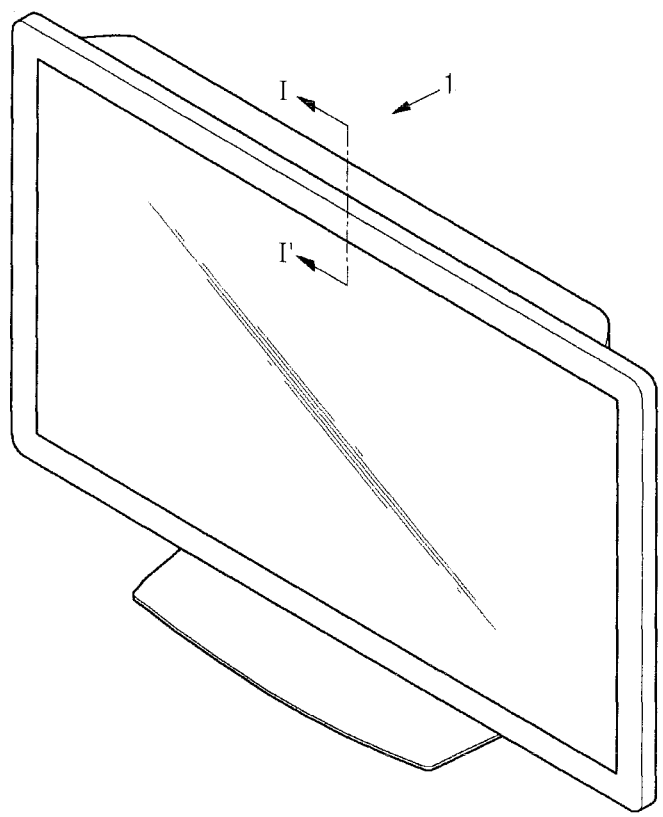
FIG. 30 is an external perspective view of a display apparatus according to an exemplary embodiment of the present invention.
Figure 31:
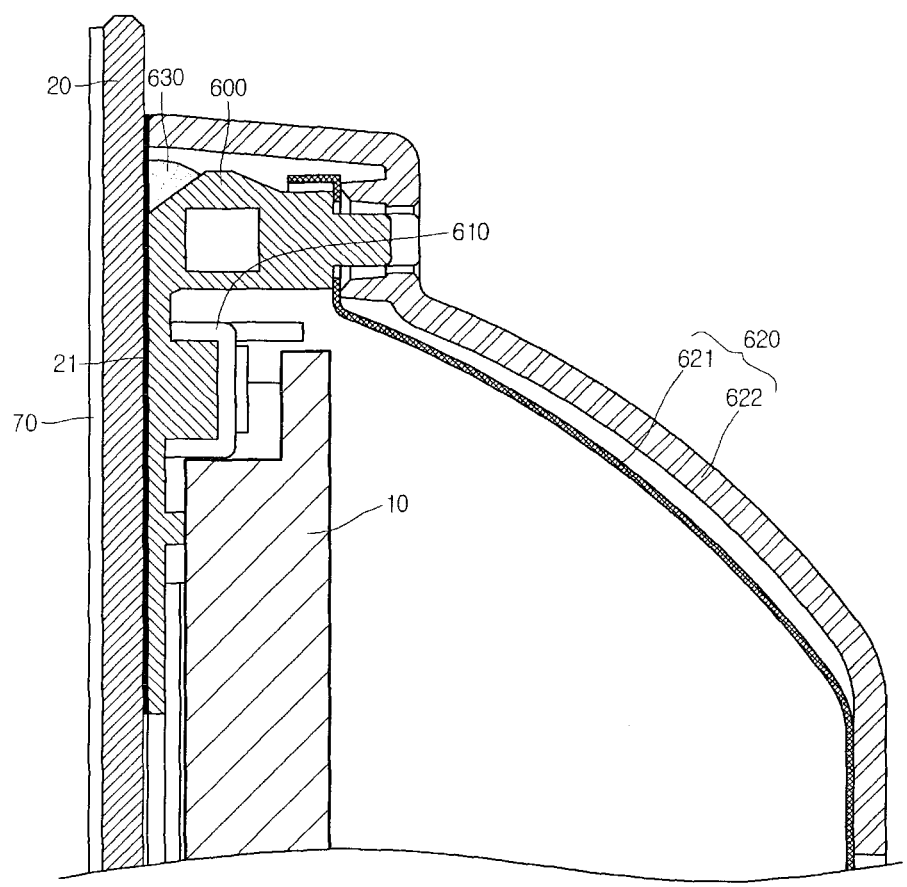
FIGS. 31 to 33 are cross-sectional views taken along line I-I' of FIG. 30.
Figure 32:
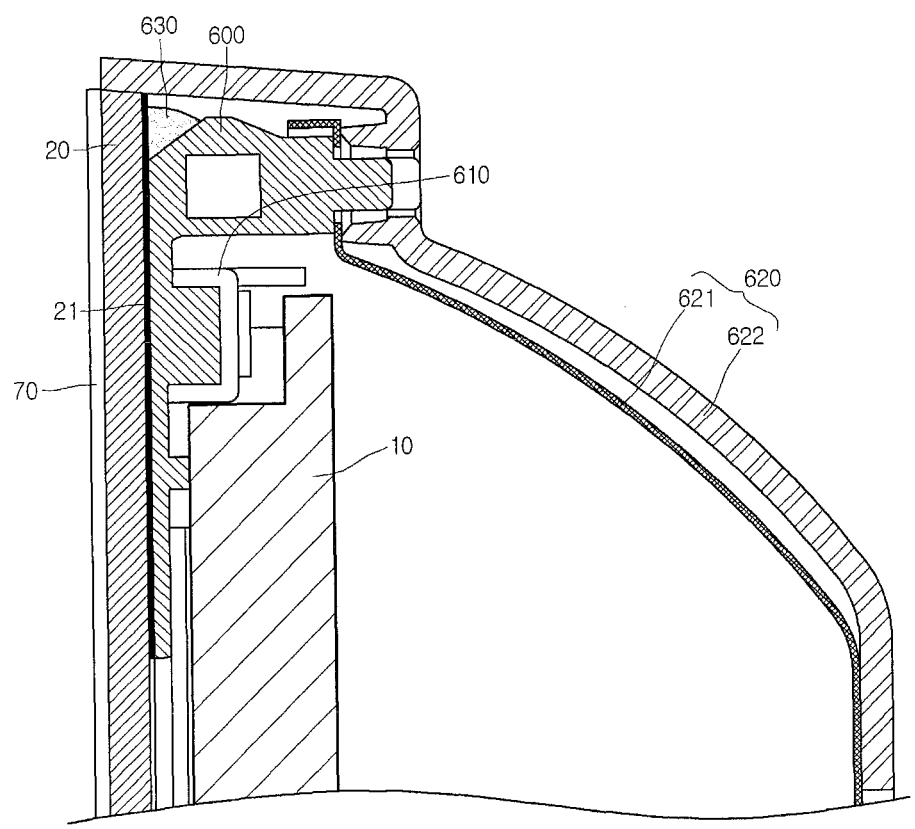
Figure 33:
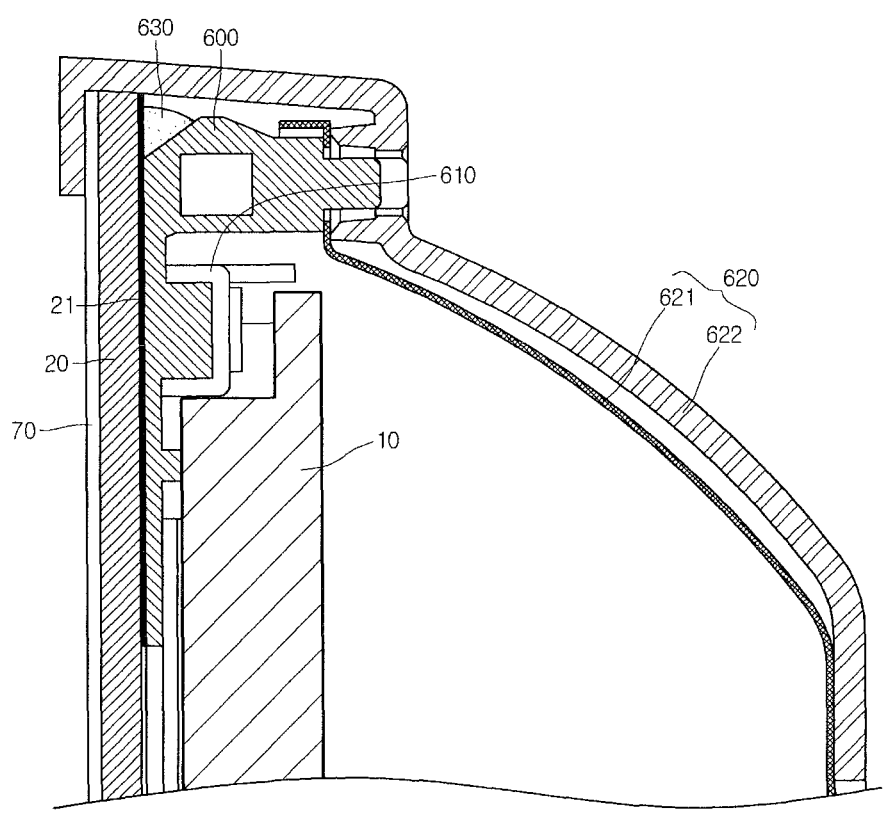

FIG. 30 is an external perspective view of a display apparatus according to an exemplary embodiment of the present invention. FIGS. 31-33 are cross-sectional views taken along line I-I' of FIG. 30. Other embodiments and configurations may also be provided.

As shown in FIGS. 30 and 31, the display apparatus 1 may include the display module 10 outputting an image, the front panel 20 protecting a front surface of the display module 10, a frame 600 having a front surface closely coupled to the front panel 20 and a rear surface to which the display module 10 is attached, a bracket 610 connecting the display module 10 with the frame 600, and a back cover 620 coupled to the rear surface of the front panel 20 to cover and protect the display module 10. The back cover 620 may correspond to the back cover 40.

An entire front surface of the front panel 20 may be made of a transparent material. The front panel 20 may cover whole of the front surface of the display module 10. The light transparent material may cover whole of the front surface of the front panel 10 and enable the 3D image output by the display module 10 to be viewed from outside of the display apparatus 1. The front panel 20 may include non-reinforced glass.

The light shielding layer 21 may be formed on a periphery of the rear surface of the front panel 20 and a sealing member 630 (i.e., silant) may be applied onto an upper part of the front surface of the frame 600 to prevent dust from being introduced into a space between the frame 600 and the front panel 20. The light shielding layer 21 may also be formed or provided at a periphery of the front layer 70, and between the front layer 70 and the front panel 20.

The frame 600 may surround a periphery of the rear surface of the front panel 20. The frame 600 may be attached to a rear surface of the front panel 20 to support the front panel 20. A plurality of frames 600 may be attached to a region spaced apart from the edge of the front panel 20 by a predetermined gap. The ends of the adjacent frames 600 may be closely connected to each other. The bracket 610 may be installed at a connection portion of the ends of frames.

The periphery of the front surface of the back cover 620 covering and protecting the display module 10 may be closely attached to the frame 600. The back cover 620 may include an inner housing 621 and an outer housing 622 covering the inner housing 621, which are made of a conductive material. The back cover 620 may not necessarily be constituted by two parts and may be constituted by one conductive cover. The back cover 620 may be considered a rear housing to accommodate the display module 10 and the frame 600 such that a portion of the frame 600 are shielded from view from outside of the display apparatus.

Additionally, the adhesion layer 22 may be provided between the front layer 70 and the front panel 20 to attach the front layer 70 to the front panel 20. The hard coating layer 80 may be provided on a front surface of the front layer 70 to reinforce rigidity of the front layer 70. The hard coating layer 80 may be provided by covering the front surface of the front layer 70 with an anti-reflection (AR) layer.

As shown in FIG. 31, an outer periphery of the front panel 20 may be exposed to the outside.

For example, when viewed from the front of the display apparatus 1, top, bottom, right, and left peripheries of the front panel 20 may be exposed to the outside without being covered by other structures such as the back cover 620, and/or the like.

As a result, an entirety of the light shielding layer 21 formed on the periphery of the rear surface of the front panel 20 may be exposed and viewed to the outside through the front panel 20 and the front layer 70.

When viewed from the rear of the display apparatus 1, the top, bottom, right, and left peripheries of the front panel 20 may be exposed to the outside without being covered by other structures.

In the above description, the display apparatus is described by using the example in which the top, bottom, right, and left peripheries of the front panel 20 are all exposed to the outside as an example, although embodiments of the present invention are not limited thereto.

For example, only parts of the top, bottom, right, and left peripheries of the front panel 20 may be exposed to the outside. Alternatively, only the periphery of the front surface of the front panel 20 may be exposed to the outside. For example, and as shown in FIG. 32, when viewed from the front of the display apparatus 1, the periphery of the front surface of the front panel 20 may be exposed to the outside without being covered by other structures. However, peripheries of the rear surface of the front panel 20 are covered by the back cover 620, such that when viewed from the rear of the display apparatus, the front panel 20 may not be exposed to the outside.

In the above description, although a periphery of the rear surface of the front panel 20 is covered by the back cover 620, embodiments of the present invention are not limited thereto and the periphery of the rear surface of the front panel 20 may be covered by the frame 600 covering the lateral surface of the display module 10 or an additional side cover (not shown).

Even as shown in FIG. 32, when viewed from the front of the display apparatus, the entire light shielding layer 21 may be exposed and viewed to the outside through the front panel 20 and the front layer 70.

A part of the periphery of the front panel 20 may be covered by other structures in front thereof, such as the front layer 70.

As shown in FIG. 33, a part adjacent the end of the periphery of the front surface of the front panel 20 may be covered by the back cover 620 (or rear housing) such that when viewed from the front of the display apparatus, the front panel 20 may not be exposed to the outside.

In the above description, although the periphery of the front surface of the front panel 20 is covered by the back cover 620, embodiments of the present invention are not limited thereto and the periphery of the rear surface of the front panel 20 may be covered by the frame 600 covering the lateral surface of the display module 10 or an additional side cover (not shown).

When viewed from the front of the display apparatus, a part adjacent to the end of the light shielding layer 21 may not be exposed to the outside through the front panel 20 and the front layer 70.

However, even as shown in FIG. 33, a size of the region of the light shielding layer 21 exposed to the outside may be larger than another region that is not exposed to the outside.

Meanwhile, as described with reference to FIG. 8, even in the display apparatus shown in FIGS. 31 to 33, the front layer 70 (or front film), such as a triacetyl cellulose (TAC) film, generates a phase difference of 10 nm or less and may be further provided on the front panel 20.

The front layer 70 generating a phase difference of 10 nm or less may be provided on a front surface of the front panel 20 (that includes non-reinforced glass), and as a result, deterioration of an image quality that may be generated at a time of displaying a 3D image may be prevented (or reduced). That is, light output from the front layer 70 and light output from the display module 10 have a phase difference of 10 nm or less. Stated differently, the phase difference between light output from the display module 10 and light output from the front layer is 10 mm or less.

A percentage of phase shift between an output of red light from the display module 10 and an output of red light from the front layer 70 is greater than a percentage of phase shift between an output of blue light from the display module 10 and an output of blue light from the front layer 70. Additionally, the percentage of phase shift between an output of blue light from the display module 10 and the output of blue light from the front layer 70 is greater than a percentage of phase shift between an output of green light from the display module 10 and an output of green light from the front layer 70.

A display apparatus may be provided that includes a front panel 20, wherein an entire front surface of the front panel 20 is made of a transparent material, and at least one frame 600 may be attached to a rear surface of the front panel 20 to support the front panel 20. The display apparatus also may include a display module 10 attached to the frame 600 to output a three-dimensional (3D) image, and a front layer 70 on a front surface of the front panel 20, wherein light output from the front layer 70 and light output from the display module 10 have a phase difference of 10 nm or less. The display apparatus may also include a rear housing (or back cover 620) to accommodate the display module 10 and the frame 600 such that a portion of the display module 10 and a portion of the frame 600 are shielded from view from outside of the display apparatus. The front panel 20 may cover whole of the front surface of the display module 10. The light transparent material may cover whole of the front surface of the front panel 20 and enable the image output by the display module 10 to be viewed from outside of the display apparatus.

According to an exemplary embodiment, a screen overlay phenomenon and an anti-reflection phenomenon that may be generated in a display image may be reduced by reducing a gap between a display panel and the front panel 20 to improve image quality and in addition, the thickness of the display apparatus may be reduced to enhance the appearance.

According to an exemplary embodiment, it is possible to reduce Newton's ring phenomenon that may be generated depending on the reduction of the gap by disposing an anti-reflection layer between the display panel and the front panel 20.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. For example, components specifically described in the embodiment of the present invention can be modified. In addition, it should be appreciated that differences related to the modification and application fall within the scope of the present invention, which is prescribed in the appended claims.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display apparatus, comprising:
    a front panel, wherein an entire front surface of the front panel is made of a transparent material, and the front panel includes non-reinforced glass;
    at least one frame attached to a rear surface of the front panel to support the front panel;
    a display module attached to the frame to output a three-dimensional (3D) image;
    an isotropic layer on a front surface of the front panel, wherein light output from the isotropic layer and light output from the display module have a phase difference of 10 nm or less; and
    a rear housing to accommodate the display module and the frame such that a portion of the display module and a portion of the frame are shielded from view from outside of the display apparatus, and wherein the front panel covers whole of the front surface of the display module, and the light transparent material covers whole of the front surface of the front panel and enables the image output by the display module to be viewed from outside of the display apparatus,
    wherein the isotropic layer and the front panel having the non-reinforced glass to reduce a polarization phenomenon of the 3D image.

2. The display apparatus of claim 1, wherein the isotropic layer is a different layer than the non-reinforced glass of the front panel.

3. The display apparatus of claim 1, wherein the isotropic layer includes a triacetyl cellulose (TAC) material.

4. The display apparatus of claim 1, further comprising:
    a light shielding layer provided between the isotropic layer and the front panel.

5. The display apparatus of claim 4, wherein the light shielding layer is formed at a periphery of a rear surface of the layer.

6. The display apparatus of claim 1, further comprising an adhesion layer between the isotropic layer and the front panel to attach the isotropic layer to the front panel.

7. The display apparatus of claim 1, further comprising a hard coating layer on a front surface of the isotropic layer to reinforce rigidity of the isotropic layer.

8. The display apparatus of claim 7, wherein the hard coating layer is provided by covering the front surface of the isotropic layer with an anti-reflection (AR) layer.

9. The display apparatus of claim 1, wherein a percentage of phase shift between an output of red light from the display module and an output of red light from the layer is greater than a percentage of phase shift between an output of blue light from the display module and an output of blue light from the layer.

10. The display apparatus of claim 9, wherein the percentage of phase shift between an output of blue light from the display module and the output of blue light from the layer is greater than a percentage of phase shift between an output of green light from the display module and an output of green light from the layer.

11. The display apparatus of claim 1, wherein the display module includes a backlight unit, the backlight unit including:
    a first layer;
    a plurality of light sources on the first layer; and
    a second layer on the first layer to cover the plurality of light sources.

12. The display apparatus of claim 11, wherein the backlight unit further includes resin between the first layer and the second layer, the resin including a plurality of scattering particles.

13. A display apparatus, comprising:
    a front panel having non-reinforced glass, wherein an entire front surface of the front panel is made of a transparent material;
    a frame attached to a rear surface of the front panel;
    a display module attached to the frame to provide a three-dimensional (3D) image;
    a triacetyl cellulose (TAC) layer on a front of the front panel to provide a phase difference, and the phase difference between light output from the display module and light output from the TAC layer is 10 nm or less, wherein the TAC layer is an isotropic layer; and
    a rear housing that covers the frame and the display module such that a portion of the display module and a portion of the frame are shielded from view from outside of the display apparatus,
    wherein the front panel covers whole of the front surface of the display module, and the front panel includes the transparent material that covers whole of the front surface of the front panel,
    wherein the isotropic layer and the front panel having the non-reinforced glass to reduce a polarization phenomenon of the 3D image.

14. The display apparatus of claim 13, further comprising:
    a light shielding layer provided between the TAC layer and the front panel.

15. The display apparatus of claim 14, wherein the light shielding layer is formed at a periphery of a rear surface of the TAC layer.

16. The display apparatus of claim 13, further comprising an adhesion layer between the TAC layer and the front panel to attach the TAC layer to the front panel.

17. The display apparatus of claim 13, further comprising a hard coating layer on a front surface of the TAC layer to reinforce rigidity of the TAC layer.

18. The display apparatus of claim 17, wherein the hard coating layer is formed by coating the front surface of the TAC film with an anti-reflection (AR) layer.

19. The display apparatus of claim 13, wherein the isotropic layer is a different layer than the non-reinforced glass of the front panel.

* * * * *